(12) United States Patent
Kimura

(10) Patent No.: US 6,865,025 B2
(45) Date of Patent: Mar. 8, 2005

(54) ABERRATION COMPENSATING OPTICAL ELEMENT, OPTICAL SYSTEM, OPTICAL PICKUP DEVICE, RECORDER AND REPRODUCER

(75) Inventor: Tohru Kimura, Hachioji (JP)

(73) Assignee: Konica Minolta Opto, Inc., Tokyo (JP)

( * ) Notice: Subject to any disclaimer, the term of this patent is extended or adjusted under 35 U.S.C. 154(b) by 0 days.

(21) Appl. No.: 10/727,638

(22) Filed: Dec. 5, 2003

(65) Prior Publication Data

US 2004/0080831 A1 Apr. 29, 2004

Related U.S. Application Data

(62) Division of application No. 10/191,478, filed on Jul. 10, 2002.

(30) Foreign Application Priority Data

| Jul. 11, 2001 | (JP) | ........................................ | 2001-210659 |
| Sep. 19, 2001 | (JP) | ........................................ | 2001-284407 |
| Feb. 28, 2002 | (JP) | ........................................ | 2002-053085 |

(51) Int. Cl.⁷ ............................................... G02B 27/44
(52) U.S. Cl. ....................... 359/565; 359/566; 359/571; 369/112.08
(58) Field of Search ................................ 359/565–576; 369/112.03–112.08, 112.12–112.13, 112.23–112.24

(56) References Cited

U.S. PATENT DOCUMENTS 5,260,828 A * 11/1993 Londono et al. ............. 359/565
5,349,471 A 9/1994 Morris ......................... 359/565
5,623,365 A 4/1997 Kuba .......................... 359/569
6,449,095 B1 9/2002 Ohtaki ....................... 359/566

FOREIGN PATENT DOCUMENTS

| JP | 59-127006 | * 7/1984 |
| JP | 61-003110 | 1/1986 |
| JP | 62-286009 | 12/1987 |
| JP | 06-082725 | 3/1994 |
| JP | 11-174318 | 7/1999 |

* cited by examiner

Primary Examiner—Drew A. Dunn
Assistant Examiner—Leo Boutsikaris
(74) Attorney, Agent, or Firm—Finnegan, Henderson, Farabow, Garrett & Dunner, L.L.P.

(57) ABSTRACT

An aberration compensating optical element includes: a diffractive structure having a plurality of ring-shaped zone steps formed into substantially concentric circles on at least one surface of the aberration compensating optical element; wherein the aberration compensating optical element is adapted for being disposed on an optical path between a light source for emitting a light having a wavelength of not more than 550 nm, and an objective lens made of a material having an Abbe constant of not more than 95.0 at a d-line; and wherein the following inequality is satisfied: $P_{\lambda 1} < P_{\lambda 0} < P_{\lambda 2}$, where $P_{\lambda 0}$ is a paraxial power (mm⁻¹) of the aberration compensating optical element at the wavelength $\lambda_0$ of the light emitted from the light source; $P_{\lambda 1}$ is a paraxial power (mm⁻¹) of the aberration compensating optical element at a wavelength $\lambda_1$ which is 10 nm shorter than the wavelength $\lambda_0$; and $P_{\lambda 2}$ is a paraxial power (mm⁻¹) of the aberration compensating optical element at a wavelength $\lambda_2$ which is 10 nm longer than the wavelength $\lambda_0$.

12 Claims, 17 Drawing Sheets

SPHERICAL ABERRATION, AXIAL CHROMATIC ABERRATION

SPHERICAL ABERRATION, AXIAL CHROMATIC ABERRATION

SPHERICAL ABERRATION, AXIAL CHROMATIC ABERRATION

FIG.12B
FIG.12A
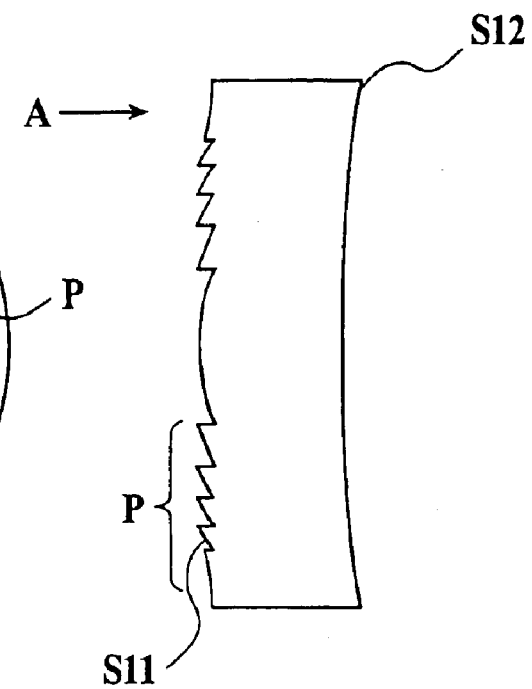
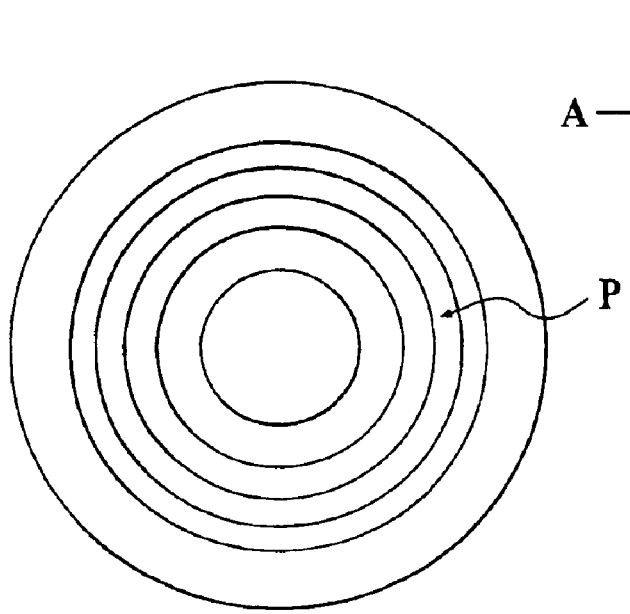
FIG.13
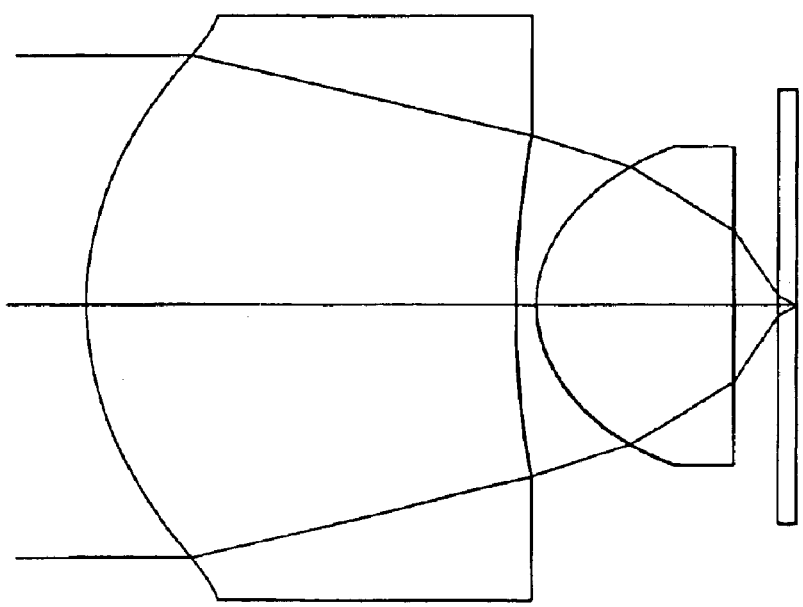

SPHERICAL ABERRATION, AXIAL CHROMATIC ABERRATION

SPHERICAL ABERRATION, AXIAL CHROMATIC ABERRATION

SPHERICAL ABERRATION, AXIAL CHROMATIC ABERRATION

SPHERICAL ABERRATION, AXIAL CHROMATIC ABERRATION

SPHERICAL ABERRATION, AXIAL CHROMATIC ABERRATION

ABERRATION COMPENSATING OPTICAL ELEMENT, OPTICAL SYSTEM, OPTICAL PICKUP DEVICE, RECORDER AND REPRODUCER

This is a division of application Ser. No. 10/191,478, filed Jul. 10, 2002, the contents of which are herein incorporated by reference. Application Ser. No. 10/191,478 claims the foreign priority benefit of Japanese Applications No. 2001-210659, filed Jul. 11, 2001, 2001-284407, filed Sep. 19, 2001, and 2002-053085, filed Feb. 28, 2002.

BACKGROUND OF THE INVENTION

1. Field of the Invention

The present invention relates to an aberration compensating optical element having a diffractive structure, an optical system comprising this aberration compensating optical element, an optical pickup device, a recorder and a reproducer. Further, the present invention relates to an aberration compensating optical element which is disposed on an optical path between a light source and a high NA objective lens having at least one plastic lens and which can minimize a change in a spherical aberration of the objective lens, which is caused by a temperature change; an optical system comprising this aberration compensating optical element and a high NA objective lens having at least one plastic lens, wherein the optical system is used for an optical pickup device for carrying out at least one of the record of information on an optical information recording medium and the reproduction of information from an optical information recording medium; an optical pickup device comprising this optical system, for carrying out at least one of the record of information on an optical information recording medium and the reproduction of information from an optical information recording medium; a recorder comprising this optical pickup device, for carrying out the record of at least one of a sound and an image on an optical information recording medium; and a reproducer for carrying out the reproduction of at least one of a sound and an image from an optical information recording medium.

2. Description of Related Art

In recent years, a new high density storage optical pickup system using a blue-violet semiconductor laser light source having an oscillation wavelength λ of about 400 nm and an objective lens having an enhanced numerical aperture (NA) of about 0.85, has been researched and developed. On an optical disk having a diameter of 12 cm, which is the same as that of a DVD (NA=0.6, λ=650 nm, storage capacity 4.7 GB), for example, an optical pickup system (NA=0.85, λ=400 nm) can record 25 GB of information.

However, when such a high NA objective lens and a short wavelength light source having the oscillation length of about 400 nm are used, a problem that an axial chromatic aberration occurs at an objective lens, is caused. In general, a laser light emitted from a semiconductor laser has a single wavelength (single mode), and it is thought that the axial chromatic aberration does not occur. In practice, there is some possibility that the mode hopping in which a center wavelength of a laser light is instantly hopped about several nanometers by changing the temperature, the output of the light or the like, occurs. Because the mode hopping is a phenomenon that a wavelength is changed so instantly that the focusing of an objective lens cannot follow the wavelength change, if a chromatic aberration occurring due to the objective lens is not compensated, a defocus component caused by the mode hopping is added. As a result, a wavefront aberration increases. In case of using a high NA objective lens or a short wavelength light source, the wavefront aberration caused at the mode hopping specially increases for the following reason. When due to a wavelength change Δλ, the spherical aberration is not changed at the objective lens and the back focus fb is changed by Δfb, if the objective lens is focused in an optical axis direction against a change of the back focus, the root mean square value $W_{rms}$ of the wavefront aberration is 0. When the objective lens is not focused, the value $W_{rms}$ is expressed by the following Formula (1).

$$W_{rms}=0.145 \cdot \{(NA)^2/\lambda\}/|\Delta fb| \qquad (1)$$

For example, when an optical pickup system for DVD (NA=0.6, λ=650 nm) is compared with one for an optical disk (NA=0.85, λ=400 nm), in case of the same Δfb, the wavefront aberration occurring in the latter optical pickup system increases by 3.26 times. That is, if the permissible value of the wavefront aberration is the same in both systems, the permissible value of |Δfb| decreases by 1/3.26 in the latter system. Therefore, it is required that the axial chromatic aberration on a wave surface of a light which transmits through the objective lens and is condensed on a storage surface of an optical disk, should be small.

In such a high density optical pickup system, in order to save the cost thereof and to lighten it, it is desired that an objective lens is a plastic lens like a conventional CD system and a DVD system. However, in a high NA plastic objective lens, when the temperature changes, the change in the spherical aberration, which is caused by the refractive index change of plastic, is large because it increases in proportion to the fourth power of NA. Therefore, in practical use, the above change becomes a significant problem.

As a cemented doublet type of objective lens for optical disk, which is formed so as to compensate the chromatic aberration, ones disclosed in Japanese Patent Publications (laid-open) No. Tokukai-Sho 61-3110 and No. Tokukai-Sho 62-286009, are known. The above lens which is formed by combining a lens made of low dispersion material having a positive refractive power and a lens made of high dispersion material having a negative refractive power, is unsuitable for an objective lens used for a optical disk, which is required to be light. Because there is a limit of the dispersion of the material, the above lens itself becomes heavy in order to obtain a high NA and to increase the refractive power of each lens.

In Japanese Patent Publication (laid-open) No. Tokukai-Hei 11-174318, an objective lens having a doublet lens structure, wherein the numerical aperture on an optical disk side is 0.85, and a hologram is provided on an optical surface in order to compensate the axial chromatic aberration, is disclosed. However, when the hologram comprises a ring-shaped zone structure having a plurality of fine steps which are formed into concentric circles, in a high objective lens which has a tendency to decrease a curvature of the optical surface, a shadow of the ring-shaped zone structure largely influences the transmitted light and then the transmittance of the light decreases. Therefore, the above objective lens is unsuitable for a high density storage optical pickup system as an information writing system which is required to have a high light utilization efficiency.

As an aberration compensating optical element for compensating the axial chromatic aberration of the objective lens, one disclosed in Japanese Patent Publication (laid-open) No. Tokukai-Hei 6-82725, is known. When the aberration compensating optical element in which a plurality of steps are formed as ring-shaped zones having the form of concentric circles around an optical axis on a plane surface perpendicular to the optical axis, is disposed in parallel light flux, a reflected light in a diffractive structure returns in the same direction as an incident light. As a result, a ghost signal is generated in a detection system of the optical pickup device. Therefore, The above lens is unsuitable for an aberration compensating optical element used in an optical pickup system.

SUMMARY OF THE INVENTION

In order to solve the above problem, an object of the present invention is to provide an optical system for optical pickup device, which can compensate the axial chromatic aberration with a relatively simple structure even though a light source having a bad monochromaticity or a light source in which a wavelength of the light suddenly changes, is used in a high density storage optical pickup system or the like, and which can be manufactured in a low cost; an optical pickup device comprising the above optical system; and a recorder and a reproducer, comprising the above optical pickup device.

Another object is to provide an aberration compensating optical element which can compensate the spherical aberration and the sine condition because of a large numerical aperture on the optical information recording medium side, and can compensate the axial chromatic aberration when an objective lens in which the axial chromatic aberration remains, is used in order to downsize an optical device, to thin it, to lighten it, and to decrease the cost thereof.

Further, another object is to provide an optical system used in optical pickup device, for suppressing the change in the spherical aberration, which is caused at an objective lens by the temperature change, with a relatively simple structure, even though a high NA plastic objective lens is used in, for example, a high density storage optical pickup system; an optical pickup device comprising the above optical system; and a recorder and a reproducer, comprising the above optical pickup device.

Further, another object is to provide an aberration compensating optical element which can compensate the change in the spherical aberration, which is caused at an objective lens by the temperature change, when a plastic objective lens in which the change of the spherical aberration is large because of the temperature change, is used.

In order to accomplish the above-mentioned object, in accordance with the first aspect of the present invention, an aberration compensating optical element comprises:

a diffractive structure having a plurality of ring-shaped zone steps formed on at least one surface of the aberration compensating optical element;

wherein the aberration compensating optical element is adapted for being disposed on an optical path between a light source for emitting a light having a wavelength of not more than 550 nm, and an objective lens made of a material having an Abbe constant of not more than 95.0 at a d-line; and wherein the following formula (2) is satisfied:

$$P_{\lambda 1} < P_{\lambda 0} < P_{\lambda 2} \qquad (2),$$

where $P_{\lambda 0}$ is a paraxial power (mm$^{-1}$) of the aberration compensating optical element at the wavelength $\lambda_0$ of the light emitted from the light source;

$P_{\lambda 1}$ is a paraxial power (mm$^{-1}$) of the aberration compensating optical element at a wavelength $\lambda_1$ which is 10 nm shorter than the wavelength $\lambda_0$; and $P_{\lambda 2}$ is a paraxial power (mm$^{-1}$) of the aberration compensating optical element at a wavelength $\lambda_2$ which is 10 nm longer than the wavelength $\lambda_0$.

The above formula (2) is a condition of the paraxial power of the aberration compensating optical element disposed between this light source emitting a light having a wavelength of not more than 550 nm and the objective lens in which the axial chromatic aberration remains, to compensate the axial chromatic aberration occurring at the objective lens, in an optical pickup device in which the light source having a bad monochromaticity or a light source in which a wavelength of the light suddenly changes, is used. The formula (2) has a meaning that the axial chromatic aberration caused in the whole system of the optical pickup system including the aberration compensating optical element and the objective lens is compensated by increasing the paraxial power of the aberration compensating optical element at the wavelength $\lambda_2$ which is 10 nm longer than the wavelength $\lambda_0$ of the light emitted from the light source, in order to over-compensate the axial chromatic aberration caused at the aberration compensating optical element, and by canceling the under-corrected axial chromatic aberration caused by the objective lens at the wavelength $\lambda_2$. By combining the aberration compensating optical element according to the present invention and the objective lens, even though the axial chromatic aberration caused at the objective lens is not precisely compensated, it is possible to use the objective lens causing a problem relating to the remaining axial chromatic aberration thereof, in an optical pickup device in which a short wavelength light source having a bad monochromaticity is provided. The paraxial power of the aberration compensating optical element is the power of the whole system of the aberration compensating optical element, which is calculated by combining the refractive power as a refractive lens and the diffractive power generated by only a diffractive structure.

In accordance with the second aspect of the present invention, an aberration compensating optical element comprises:

a diffractive structure having a plurality of ring-shaped zone steps formed on at least one surface of the aberration compensating optical element;

wherein the aberration compensating optical element is adapted for being disposed on an optical path between a light source for emitting a light having a wavelength of not more than 550 nm, and an objective lens made of a material having an Abbe constant of not more than 95.0 at a d-line; and wherein at least one ring-shaped zone step having a step distance $\Delta$ (mm) in a direction of an optical axis between adjacent steps of the plurality of ring-shaped zone steps is formed within an effective diameter so that m, defined by following equations:

$$m = INT(Y),$$

$$Y = \Delta \times (n-1)/(\lambda_0 \times 10^{-3}) \qquad (3),$$

is an integer except 0 and ±1, where INT(Y) is an integer obtained by rounding Y, $\lambda_0$ is the wavelength (nm) of the light emitted from the light source, and n is a refractive index of the aberration compensating optical element at the wavelength $\lambda_0$ (nm).

The above formula (3) has a meaning that the difference $\Delta$ in a direction of an optical axis between adjacent steps of the plurality of ring-shaped zone steps of the aberration compensating optical element is determined so that a diffracted light amount of the higher order diffracted light having a diffraction order which is two or more, is larger than those of the diffracted lights having the other diffraction orders, when the incident light flux is diffracted by the diffractive structure formed on the optical surface of the aberration compensating optical element.

In accordance with the third aspect of the present invention, an aberration compensating optical element comprises:

a diffractive structure having a plurality of ring-shaped zone steps formed on at least two surfaces of the aberration compensating optical element;

wherein the aberration compensating optical element is adapted for being disposed on an optical path between a light source for emitting a light having a wavelength of not more than 550 nm, and an objective lens made of a material having an Abbe constant of not more than 95.0 at a d-line.

In a general optical material, when the wavelength of the light becomes short, the change in the refractive index, which is caused by a slight wavelength change, becomes large. In case of using a short wavelength light source emitting a light having a wavelength λ of not more than 550 nm, when a slight wavelength change is caused, the axial chromatic aberration caused at the objective lens becomes large. Therefore, the required power of the aberration compensating optical element as a diffractive lens must be large in order to compensate the axial chromatic aberration caused at the objective lens. When the power of the objective lens is $\phi_{OBJ}$, and the power of the aberration compensating optical element is $\phi_{SA}$, in order not to change the back focus by the wavelength change in the compound system including the objective lens and the aberration compensating objective element, the following formula (4) may be satisfied:

$$d\phi_{SA}/d\lambda = -d\phi_{OBJ}/d\lambda \tag{4}$$

On the other hand, the relation between the change in the power of the objective lens, which is caused by the wavelength change, and the change in the back focus, is expressed by the following formula (5). Because the power of the aberration compensating optical element as a diffractive lens is proportional to the wavelength, the power is expressed by the following formula (6).

$$d\phi_{OBJ}/d\lambda = -(dfB/d\lambda) \cdot d\phi_{OBJ}^2 \tag{5}$$

$$d\phi_{SA}/d\lambda = \phi_{SA}/\lambda \tag{6}$$

When the formulas (5) and (6) are substituted for the formula (4), the power $\phi_{SA}$ of the aberration compensating optical element as a diffractive lens is expressed by the following formula (7):

$$\phi_{SA} = (dfB/d\lambda) \cdot d\phi_{OBJ}^2 \tag{7}$$

For example, in case of a general objective lens for DVD, which has a focal length of 3.33 mm, a working wavelength of 650 nm, an NA of 0.6, an entrance pupil with a diameter φ of 4 mm, and a vd of 55, because dfB/dλ is 0.15 μm/nm, the power $\phi_{SA}$ of the aberration compensating optical element is determined as shown in the following formula (8):

$$\phi_{SA} = 0.15 \times 10^{-3} \cdot 650 \cdot (1/3.33)^2 = 1/92.3 \text{ (mm}^{-1}\text{)} = 1.1 \times 10^{-2} \text{ (mm}^{-1}\text{)} \tag{8}$$

In case of the objective lens for a high density storage optical pickup device, which has a focal length of 2.35 mm, a working wavelength of 405 mm, an NA of 0.85, an entrance pupil with a diameter of 4 mm, and a vd of 55, because dfB/dλ is 0.40 μm/nm, the power $\phi_{SA}$ of the aberration compensating optical element is determined as shown in the following formula (9):

$$\phi_{SA} = 0.40 \times 10^{-3} \cdot 405 \cdot (1/2.35)^2 = 1/34.1 \text{ (mm}^{-1}\text{)} = 2.9 \times 10^{-2} \text{ (mm}^{-1}\text{)} \tag{9}$$

That is, it is required that the aberration compensating optical element for a high density storage optical pickup device has a power which is 2.7 times larger than one for DVD. In practical, because an objective lens for a high density storage optical pickup device has a large NA, a focal depth is small. Therefore, it is required that the axial chromatic aberration is precisely compensated. The required power of the aberration compensating optical element for a high density storage optical pickup device becomes larger than the formula (9).

The optical path difference Φ generated in a transmitted wave surface by the aberration compensating optical element having the power $\phi_{SA}$ is expressed by the following formula (10) as a function of the height h from the optical axis, $$\Phi = (\phi_{SA}/2) \cdot h^2 \tag{10}$$

The interval Λ of the adjacent ring-shaped zones in the diffractive ring-shaped zone structure formed on the aberration compensating optical element, which is measured in a direction perpendicular to the optical axis, is expressed by the following formula (11):

$$\Lambda = m \cdot \lambda_0 / (d\Phi/dh) \tag{11},$$

where $\lambda_0$ is the optimum wavelength, and m is the diffraction order of the diffracted light having the maximum diffracted light amount.

When the formula (11) is substituted for the formula (10), the interval Λ of the adjacent ring-shaped zones in the diffractive ring-shaped zone structure is determined by the following formula (12):

$$\Lambda = m \cdot \lambda_0 / (\phi_{SA} \cdot h) \tag{12}$$

Therefore, in the above-described aberration compensating optical element for DVD, when the optimum wavelength for the ring-shaped zone structure is 650 nm, the interval $\Lambda_{650}$ of the diffractive ring-shaped zone structure in the height 2 mm from the optical axis, is expressed by the following formula (13):

$$\Lambda_{650} = m \cdot 650 \times 10^{-3} / (1/92.3 \cdot 2) = 30 \cdot m \text{ (μm)} \tag{13}$$

On the other hand, in the above-described aberration compensating optical element for a high density storage optical pickup device, when the optimum wavelength for the ring-shaped zone structure is 405 nm, the interval $\Lambda_{405}$ of the diffractive ring-shaped zone structure in the height 2 mm from the optical axis, is expressed by the following formula (14):

$$\Lambda_{405} = m \cdot 405 \times 10^{-3} / (1/34.1 \cdot 2) = 6.9 \cdot m \text{ (μm)} \tag{14}$$

In the formula (14), when the diffractive ring-shaped zone structure is determined so that the first order diffracted light has the maximum diffracted light amount, the interval of the adjacent ring-shaped zones in the diffractive ring-shaped zone structure is 6.9 μm in the position corresponding to the entrance pupil of the objective lens. Therefore, there is some possibility that a light mount loss occurring due to a phase non-matching portion of the ring-shaped zone, which is caused by the transferring the shape of edge portion of a diamond tool, when a mold for injection molding is processed by cutting with SPDT, influences greatly. Further, in case that the interval of the ring-shaped zones in the diffractive ring-shaped zone structure is small, it is difficult that the shape of the ring-shaped zone is transferred in the molding. Thereby, alight amount loss occurring due to a phase non-matching portion also influences greatly.

As described above, like the aberration compensating optical element according to the second aspect of the present invention, the difference $\Delta$ (mm) in a direction of an optical axis between adjacent steps of the plurality of ring-shaped zone steps of the aberration compensating optical element is determined so that a diffracted light amount of the higher order diffracted light having a diffraction order which is m or more (where m is an integer of not less than 2), is larger than those of the diffracted lights having the other diffraction orders. From the above formula (14), the interval of the adjacent ring-shaped zones in the diffractive ring-shaped zone structure can be m times wider. Therefore, the influence of a light amount loss caused by the phase non-matching portion can be small.

Further, like the aberration compensating optical element according to the third aspect of the present invention, when the diffractive ring-shaped zone structures are formed on n (n is an integer of not less than 2) or more optical surface and the required power $\phi_{SA}$ of the aberration compensating optical element is equally divided into n optical surfaces, the power of each surface becomes $\phi_{SA}/n$. From the formula (12), the interval of the ring-shapes zones in the diffractive ring-shaped zone structure can be n times larger. Therefore, the influence of a light amount loss caused by the phase non-matching portion can be small.

For example, the diffractive ring-shaped zone structures are formed on two optical surfaces. Further, the difference $\Delta$ (mm) in a direction of an optical axis between adjacent steps of the plurality of ring-shaped zone steps of the aberration compensating optical element is determined so that a diffracted light amount of the higher order diffracted light having a diffraction order of 2, is larger than those of the diffracted lights having the other diffraction orders. In this case, from the formulas (12) and (14), the interval of the adjacent ring-shaped zones in the diffractive ring-shaped zone structure can be 27.6 μm in the position corresponding to the entrance pupil of the above objective lens.

In accordance with the fourth aspect of the present invention, an aberration compensating optical element comprises:

a single lens;

wherein the single lens has one optical surface having a diffractive structure having a plurality of ring-shaped zone steps formed on a plane surface and another optical surface opposite to the one optical surface, which has a concave refractive surface; and wherein the aberration compensating optical element is adapted for being disposed on an optical path between a light source for emitting a light having a wavelength of not more than 550 nm, and an objective lens made of a material having an Abbe constant of not more than 95.0 at a d-line.

In the present invention, the phrase "a diffractive structure having a plurality of ring-shaped zone steps is formed on a plane surface" has the same meaning that a line (an envelope) by which the peaks of the ring-shaped zone steps are connected with each other, becomes a straight line in FIGS. 2A and 12A described below.

When the diffractive ring-shaped zone structure is formed on a plane surface, the reflected light which is reflected by the diffractive structure, travels in a different direction from the incident light. Therefore, it can be prevented that a ghost signal is generated in a detection system of the optical pickup device. Further, because the reflecting power of the optical surface on which the diffractive ring-shaped zone structure is formed, is 0, the total power which is the sum of the refractive power and the diffractive power, can be calculated by the formula (7). A refractive surface having a negative refractive power is formed on an optical surface opposite to the optical surface on which the diffractive structure is formed, so that the absolute value of the refractive power of the refracting surface is same as that of the power calculated by the formula (7). Thereby, the power of the whole system of the aberration compensating optical element can be 0. Therefore, it becomes easy that the aberration compensating optical element is disposed in the parallel light flux.

Further, when the diffractive ring-shaped zone structure is formed on a plane surface, it is possible that the aberration compensating optical element for a high density storage optical pickup device, in which the interval of the ring-shaped zone in the diffraction ring-shaped structure is several micro-meter as calculated by the above formula (14), can be prepared by using the electron beam drawing by which a fine diffractive structure can be formed without the form error. The method for preparing the fine diffractive structure by using the electron beam drawing is disclosed in "OPTICAL DESIGN, Journal of Optics Design Group, No. 20, 2000.2.25, pp. 26–31".

In the above-described aberration compensating optical element, the following formula (15) may be satisfied:

$$0.5 \times 10^{-2} < P_D < 15.0 \times 10^{-2} \quad (15),$$

where $P_D$ is a paraxial power (mm$^{-1}$) of the diffractive structure and is defined by the following equation:

$$P_D = \Sigma(-2 \cdot b_{2i} \cdot ni),$$

when an optical path difference function is defined by the following equation:

$$\Phi bi = ni \cdot (b_{2i} \cdot hi^2 + b_{4i} \cdot hi^4 + b_{6i} \cdot hi^6 + \ldots),$$

as a function that an optical path difference $\Phi bi$ added to a wavefront transmitting through the aberration compensating optical element, by the diffractive structure formed on an i-th surface of the aberration compensating optical element, is expressed by using a height hi (mm) from the optical axis; where ni is a diffraction order of a diffracted light having a maximum diffracted light amount among a plurality of diffracted lights generated by the diffractive structure formed on the i-th surface, and $b_{2i}, b_{4i}, b_{6i}, \ldots$ are a second order coefficient of the optical path difference function, a fourth order one, a sixth order one . . . , respectively.

As described above, for example, in order to compensate the axial chromatic aberration occurring at the objective lens having a focal length of 2.35 mm, a working wavelength of 405 mm, an NA of 0.85, an entrance pupil with a diameter $\phi$ of 4 mm, and a vd of 55, the aberration compensating optical element for a high density storage optical pickup device is required to have a diffractive power $\phi_{SA}$ of about $2.9 \times 10^{-2}$ (mm$^{-1}$). In practice, because an objective lens for a high density storage optical pickup device has a large NA, a focal depth is small. Therefore, it is required that the axial chromatic aberration is precisely compensated. The required power of the aberration compensating optical element for a high density storage optical pickup device becomes larger than the above value. Further, the required power of the aberration compensating optical element is changed according to the focal length of the objective lens and the Abbe constant. Therefore, like the above formula (15), the condition is determined as a preferable range of the power of the aberration compensating optical element for a high density storage optical pickup device.

At the lower limit of the formula (15), the axial chromatic aberration of the wave surface condensed on the information recording surface of the optical information recording medium is not too under-corrected. At the upper limit of the formula (15), the axial chromatic aberration of the wave surface condensed on the information recording surface of the optical information recording medium is not too over-corrected. In order to obtain the above function, it is more preferable that the following formula (16) is satisfied:

$$1.0\times10^{-2} < P_D < 10\times10^{-2} \qquad (16).$$

In the above-described aberration compensating optical element, it is preferable that the paraxial power $P_{\lambda 0}$ of the aberration compensating optical element is substantially zero at the wavelength $\lambda_0$ of the light emitted from the light source. Therefore, it becomes easy that the aberration compensating optical element is disposed in the parallel light flux. In the concrete, wherein the following formulas (17) to (19) are satisfied:

$$P_D > 0 \qquad (17)$$

$$P_R < 0 \qquad (18)$$

$$-0.9 < P_D/P_R < -1.1 \qquad (19),$$

where $P_R$ is a refractive power (mm$^{-1}$) of the aberration compensating optical element as a refractive lens.

In the above-described aberration compensating optical element, it is preferable that the diffractive structure has such a spherical aberration property that a spherical aberration of an emergent light flux is changed in an under-corrected direction or an over-corrected direction when a wavelength of an incident light flux is shifted to a longer wavelength side;

wherein the diffractive structure is formed so as to satisfy the following inequality:

$$0.2 \leq |(P_{hf}/P_{hm})-2| \leq 6.0 \qquad (20),$$

where $P_{hf}$ is a first interval in a direction to perpendicular to an optical axis of the diffractive structure between adjacent steps of the ring-shaped zones of the diffractive structure at a diameter hf which is a half of a maximum effective diameter hm, and $P_{hm}$ is a second interval in the direction to perpendicular to the optical axis of the diffractive structure between adjacent steps of the ring-shaped zones of the diffractive structure at the maximum effective diameter hm.

In case that a short wavelength light source emitting a light having a wavelength of not more than 550 nm, in particular, about 400 nm, as described above, the refractive index change of the lens material, which is caused by a slight wavelength change, becomes large. Therefore, when the slight wavelength change is caused, the axial chromatic aberration is caused at the objective lens and the spherical aberration caused at the objective lens is changed. For example, in case of an objective lens having a single lens structure, when the wavelength is shifted to 10 nm longer wavelength side than the design wavelength, the spherical aberration is changed in an over-corrected direction. In case of an objective lens having a doublet structure, when the wavelength is shifted to 10 nm longer wavelength side than the design wavelength, the spherical aberration is changed in an over-corrected direction or in an under-corrected direction, according to a power arrangement in the lens group.

The formula (20) is a condition to compensate the spherical aberration change caused at the objective lens, by a diffracting function of the aberration compensating optical element. If the optical path difference function has only second order coefficient of the optical path difference function (also referred to as "coefficient of a diffractive surface), the condition is $(P_{hf}/P_{hm})-2=0$. However, in the aberration compensating optical element according to the present invention, higher order coefficients of the optical path difference function are used in order to precisely compensate the spherical aberration change which is caused at the objective lens by a slight wavelength change from the design wavelength, with the diffracting function of the diffractive structure in the aberration compensating optical element. Therefore, it is preferable that the formula $(P_{hf}/P_{hm})-2$ has a value apart from 0 to a certain degree. If the formula (20) is satisfied, the above spherical aberration change is excellently cancelled by the diffracting function.

In the above-described aberration compensating optical element, when a wavelength of a light entering the diffractive structure is not more than 550 nm, it is preferable that a diffraction efficiency of the diffractive structure becomes maximal. More preferably, the design wavelength of the objective lens is substantially the same as the wavelength at which the diffraction efficiency becomes maximal.

In the above-described aberration compensating optical element, it is preferable that the aberration compensating optical element is a plastic lens. As an optical plastic material, for example, olefin resin, polymethylmethacrylate, styrene acrylonitrile, polycarbonate, thermosetting plastics, polystyrene or the like is exemplified. Preferable optical plastic material has an internal transmittance of not less than 80% when the transmitted light has the wavelength of not more than 550 nm and the optical plastic has the thickness of 3 mm. In case that the aberration compensating optical element is disposed in an optical pickup device as an element separated from the objective lens like the aberration compensating optical element according to the present invention, it is not strongly required that to thin the aberration compensating optical element or to downsize it like the objective lens in order to obtain the operating distance and to lighten it. Therefore, a refraction-diffraction-integrated type of optical element lens which is made of the optical plastic material, can be easily produced by the injection molding method or the like using a mold at a low cost.

In accordance with the fifth aspect of the present invention, an optical system for carrying out at least one of a record of information on an information recording surface of an optical information recording medium and a reproduction of information from the information recording surface; comprises:

a light source for emitting a light having a wavelength of not more than 550 nm;

an objective lens made of a material having an Abbe constant of not more than 95.0 at a d-line; and any one of the above-described aberration compensating optical elements, which is disposed on an optical path between the light source and the objective lens.

In accordance with the sixth aspect of the present invention, an optical pickup device for carrying out at least one of a record of information on an information recording surface of an optical information recording medium and a reproduction of information from the information recording surface; comprises:

an optical system comprising: a light source for emitting a light having a wavelength of not more than 550 nm; an objective lens made of a material having an Abbe constant of not more than 95.0 at a d-line; and an aberration compensating optical element, which is disposed on an optical path between the light source and the objective lens;

wherein the optical pickup device comprises the above-described optical system as a condensing optical system.

According to the above-described optical system, it is possible to realize an optical system for optical pickup device and an optical pickup device, which can compensate the axial chromatic aberration with a relatively simple structure even though a light source having a bad monochromaticity or a light source in which a wavelength of the light suddenly changes, is used in a high density storage optical pickup system or the like, and which can be manufactured in a low cost.

In the present invention, the optical information recoding medium includes not only a current optical information recoding medium having a disk-shape, for example, each type of CD, such as CD, CD-R, CD-RW, CD-Video, CD-ROM or the like, and each type of DVD, such as DVD, DVD-ROM, DVD-RAM, DVD-R, DVD–RW, DVD+RW or the like, and MD or the like but also a next generation high density recording medium or the like.

The above-described optical pickup device according to the present invention, can be provided in a recorder and a reproducer for at least one of a sound and an image, for example, a player or a drive which is compatible with an optical information recording medium, such as CD, CD-R, CD-RW, CD-Video, CD-ROM, DVD, DVD-ROM, DVD-RAM, DVD-R, DVD–RW, DVD+RW, MD or the like, or an AV apparatus, a personal computer or other information terminals into which the player or the drive is incorporated, or the like.

In accordance with the seventh aspect of the present invention, an aberration compensating optical element comprises:

a plastic lens having a single lens structure, and comprising a diffractive structure having a plurality of ring-shaped zone steps formed on at least one surface of the plastic lens;

wherein the aberration compensating optical element is adapted for being disposed on an optical path between a light source and an objective lens having an image-side numerical aperture of not less than 0.75 and comprising at least one plastic lens; and wherein the aberration compensating optical element decreases a change $\Delta 3SA_{OBJ}$ in a third-order spherical aberration of the objective lens, which is caused by a refractive index change $\Delta N_{OBJ}$ of at least one plastic lens contained in the objective lens due to a temperature change of the objective lens, by using an inclination change of a marginal ray of an emergent light flux from the aberration compensating optical element, which is caused by a refractive index change $\Delta N_{AC}$ of the aberration compensating optical element due to a temperature change of the aberration compensating optical element.

As described above, the aberration compensating optical element according to the present invention, comprises a plastic lens comprising a diffractive structure having a plurality of ring-shaped zone steps formed into substantially concentric circles on at least one surface of the plastic lens; wherein the aberration compensating optical element is adapted for being disposed on an optical path between a light source and an objective lens having an image-side numerical aperture of not less than 0.75 and comprising at least one plastic lens. A general optical plastic material has a property that when the temperature rises, the refractive index thereof decreases and when the temperature falls, the refractive index thereof increases. An amount of the change in the refractive index of the optical plastic material, which is caused by the temperature change, is larger than that of the optical glass material in the number of zeroes. Therefore, the power of the whole system of the aberration compensating optical element which is a plastic lens, is constant. The diffractive structure having a plurality of ring-shaped zone steps is formed into substantially concentric circles on at least one surface of the aberration compensating optical element to suitably distribute the power to the diffractive power as a diffractive lens and the refractive power as a refractive lens. Thereby, it is possible to select an amount of the inclination change of a marginal ray of an emergent light flux from the aberration compensating optical element, which is caused by changing the refractive index change of the aberration compensating optical element due to the temperature change.

As an optical plastic material, for example, olefin resin, polymethylmethacrylate, styrene acrylonitrile, polycarbonate, thermosetting plastics, polystyrene or the like is exemplified. Preferable optical plastic material has an internal transmittance of not less than 80% when the transmitted light has the wavelength of not more than 550 nm and the optical plastic has the thickness of 3 mm.

When the above aberration compensating optical element is disposed on an optical path between the light source and the objective lens comprising at least one plastic lens, it is possible that the change in the third-order spherical aberration of the objective lens, which is caused by a refractive index change of the plastic lens due to the temperature change, is changed so as to cancel it by the inclination change of the marginal ray of the emergent light flux from the aberration compensating optical element. Therefore, even though a high NA objective lens having at least one plastic lens, which has a narrow usable temperature range, is used, the usable temperature range can be expanded by using the objective lens with the aberration compensating optical element according to the present invention. As a result, in a high density storage optical pickup system in which the objective lens having an image-side numerical aperture of not less than 0.75 is required, a plastic lens can be used as an objective lens. Therefore, it is possible to decrease the cost of the optical pickup device.

In the above-described aberration compensating optical element, it is preferable that the following formula (21) is satisfied:

$$P_{T1} < P_{T0} < P_{T2} \quad (21),$$

where $P_{T0}$ is a paraxial power (mm$^{-1}$) of the aberration compensating optical element at a predetermined temperature $T_0$;

$P_{T1}$ is a paraxial power (mm$^{-1}$) of the aberration compensating optical element at a temperature $T_1$ which is lower than the predetermined temperature $T_0$; and $P_{T2}$ is a paraxial power (mm$^{-1}$) of the aberration compensating optical element at a temperature $T_2$ which is higher than the predetermined temperature $T_0$.

Because the aberration compensating optical element satisfies the above formula (21), when the temperature rises, an inclination of an upper marginal ray of the emergent light flux from the aberration compensating optical element is changed in a direction of decreasing it as compared with a previous temperature change, that is, in a clockwise direction on the basis of the optical axis. This phenomenon has the same effect as a phenomenon that the magnification of the objective lens is changed in a direction of increasing it. Therefore, in the optical pickup optical device, when the temperature rises, the change in the third-order spherical aberration, which is caused by changing the temperature of the objective lens, can be decreased so as to cancel it by using the aberration compensating optical element with the objective lens having a temperature property that the third-order spherical aberration is changed in an under-corrected direction.

It is preferable that the predetermined temperature $T_0$ is 25° C. and that the temperature difference between $T_0$ and $T_1$ and the temperature difference between $T_0$ and $T_2$ are 30° C.

It is preferable that the objective lens is one having a doublet lens structure in which a first lens having a positive refractive power and a second lens having a positive refractive power are arranged in an order from a side of the objective lens; and at least the first lens is a plastic lens.

As an objective lens having a temperature property that the third-order spherical aberration component thereof is changed in an under-corrected direction when the temperature rises, the above-described objective lens having a doublet lens structure is exemplified. At least the first lens is a plastic lens. In order to decrease a cost and to lighten the optical system, it is preferable that both of the first lens and the second lens are plastic lenses.

In case that the aberration compensating optical element is used with the above-described objective lens having a doublet lens structure, it is preferable that the aberration compensating optical element according to the present invention satisfies the following formulas (22) and (23):

$$P_R < 0 \tag{22}$$

$$0 < \Delta P_{AC}/\Delta T_{AC} < 1 \times 10^{-4} \tag{23}$$

where $P_R$ is a refractive power (mm$^{-1}$) of the aberration compensating optical element as a refractive lens; and $\Delta P_{AC}$ is an amount of a change in a paraxial power (mm$^{-1}$) of the aberration compensating optical element, which is caused by the temperature change $\Delta T_{AC}$ (° C.) of the aberration compensating optical element.

When the refractive power of the aberration compensating optical element as a refractive lens satisfies the formula (22), a sign of an amount of the change ($\Delta P_{AC}/\Delta T_{AC}$) in the paraxial power of the aberration compensating optical element, which is caused by the temperature change, is positive. Therefore, when the temperature changes, the change in the third-order spherical aberration of the objective lens having a doublet lens structure is decreased so as to cancel it. On the other hand, when the value of the formula ($\Delta P_{AC}/\Delta T_{AC}$) is smaller than the upper limit of the formula (22), when the temperature changes, the third-order spherical aberration of the objective lens having a doublet lens structure is not too compensated. As described above, when the value of the formula ($\Delta P_{AC}/\Delta T_{AC}$) satisfies the formula (22), it is possible to suitably compensate the spherical aberration change of the objective lens having a doublet lens structure, which is caused by the temperature change.

It is preferable that the light source is one for emitting a light having a wavelength of not more than 550 nm; and
wherein the following formula (24) is satisfied:

$$P_{\lambda 1} < P_{\lambda 0} < P_{\lambda 2} \tag{24}$$

where $P_{\lambda 0}$ is a paraxial power (mm$^{-1}$) of the aberration compensating optical element at the wavelength $\lambda_0$ of the light emitted from the light source;

$P_{\lambda 1}$ is a paraxial power (mm$^{-1}$) of the aberration compensating optical element at a wavelength $\lambda_1$ which is 10 nm shorter than the wavelength $\lambda_0$; and $P_{\lambda 2}$ is a paraxial power (mm$^{-1}$) of the aberration compensating optical element at a wavelength $\lambda_2$ which is 10 nm longer than the wavelength $\lambda_0$.

As described above, because the aberration compensating optical element has a wavelength property to satisfy the formula (24), when a light having a different wavelength from one having a predetermined wavelength by a predetermined wavelength difference, enters the aberration compensating optical element, the axial chromatic aberration occurring at the aberration compensating optical element and the axial chromatic aberration occurring at the objective lens are cancelled to compensate the axial chromatic aberration caused by the wavelength change. Therefore, the axial chromatic aberration is minimized at the condensing spot formed by condensing the light transmitting the aberration compensating optical element and the objective lens on the information recording surface of the optical information recording medium. By using the aberration compensating optical element according to the present invention with the objective lens, even though the axial chromatic aberration caused at the objective lens is not precisely compensated, the objective lens can be used as an objective lens for a high density optical information recording medium.

When the change in the third-order spherical aberration component of the objective lens, which is caused by the temperature change, is decreased so as to cancel it, in order to minimize the remaining aberration of the whole system, it is preferable that the objective lens which is used with the aberration compensating optical element, satisfies the formula (25). Thereby, when the change in the third-order spherical aberration component of the objective lens, which is caused by the temperature change, is decreased so as to cancel it, it is possible to minimize the remaining aberration.

The following formulas (26) to (28) are conditions for decreasing the change in the spherical aberration of the objective lens, which is caused by the temperature change, so as to excellently cancel it and for minimizing the axial chromatic aberration at the condensing spot on the information recording surface of the optical information recording medium. In case that when the temperature changes, the change in the third-order spherical aberration of the objective lens satisfies the formula (26) and the axial chromatic aberration occurring the objective lens satisfies the formula (27), the diffractive structure having a diffractive power which satisfies the formula (28) is formed on the aberration compensating optical element. Thereby, the compensation for the temperature property of the objective lens and the compensation for the axial chromatic aberration occurring at the objective lens are compatible.

$$|\Delta 3SA_{OBJ}|/|\Delta 5SA_{OBJ}| > 1 \tag{25}$$

$$-30.0 \times 10^{-4} < \Delta 3SA_{OBJ}/(\Delta T_{OBJ} \cdot NA^4 \cdot f_{OBJ}) < 0 \tag{26}$$

$$3 \times 10^{-2} < \Delta fB_{OBJ} \cdot \nu d_{OBJ}/f_{OBJ} < 14 \times 10^{-2} \tag{27}$$

$$1.0 \times 10^{-2} < P_D < 10.0 \times 10^{-2} \tag{28}$$

where $\Delta 3SA_{OBJ}$ is a change in a third-order spherical aberration component of a Zernike polynomial into which an aberration of the objective lens is expanded, in case that a refractive index of the plastic lens in the objective lens is changed by $\Delta N_{OBJ}$ due to the temperature change $\Delta T_{OBJ}$ (° C.) of the objective lens; the change in the third-order spherical aberration being expressed by an RMS (root mean square value) by a wavelength $\lambda_0$ of a light emitted from the light source; and a sign of the change in the third-order spherical aberration being positive when the third-order spherical aberration component is changed in an over-corrected direction, and being negative when the third-order spherical aberration component is changed in an under-corrected direction;

$\Delta 5SA_{OBJ}$ is a change in a fifth-order spherical aberration component of the Zernike polynomial into which the aberration of the objective lens is expanded, in case that the refractive index of the plastic lens in the objective lens is changed by $\Delta N_{OBJ}$ due to the temperature change $\Delta T_{OBJ}$ (° C.) of the objective lens; the change in the fifth-order spherical aberration being expressed by an RMS (root mean square value) by the wavelength $\lambda_0$ of a light emitted from the light source;

NA is a predetermined image-side numerical aperture which is required for at least one of a record of information on an optical information recording medium and a reproduction of information from the optical information recording medium;

$f_{OBJ}$ is a focal length (mm) of the objective lens;

$\Delta fB_{OBJ}$ is an axial chromatic aberration (mm) occurring at the objective lens when a light having a wavelength which is +10 nm longer than the wavelength $\lambda_0$ of a light emitted from the light source enters the objective lens;

$vd_{OBJ}$ is a mean value of an Abbe constant of the first lens in the objective lens at the d-line and an Abbe constant of the second lens at the d-line; and $P_D$ is a paraxial power (mm$^{-1}$) of the diffractive structure and is defined by the following equation:

$$P_D = \Sigma(-2 \cdot b_{2i} \cdot ni),$$

when an optical path difference function is defined by the following equation:

$$\Phi bi = ni \cdot (b_{2i} \cdot hi^2 + b_{4i} \cdot hi^4 + b_{6i} \cdot hi^6 + \ldots),$$

as a function that an optical path difference $\Phi bi$ added to a wavefront transmitting through the diffractive structure formed on an i-th surface of the aberration compensating optical element, by the diffractive structure formed on the i-th surface, is expressed by using a height hi (mm) from an optical axis; where $b_{2i}$, $b_{4i}$, $b_{6i}$, . . . are a second order coefficient of the optical path difference function, a fourth order one, a sixth order one . . . , respectively, and ni is a diffraction order of a diffracted light having a maximum diffracted light amount among a plurality of diffracted lights generated by the diffractive structure formed on the i-th surface.

It is preferable that the above-described aberration compensating optical element comprises one optical surface on which the diffractive structure having a plurality of macroscopically plane ring-shaped zone steps is formed, that is, one optical surface having a diffractive structure having a plurality of ring-shaped zone steps formed on a plane surface and another optical surface opposite to the one optical surface, which has a concave refractive surface.

When the diffractive surface having the diffractive ring-shaped zone structure is formed on a plane surface, the reflected light which is reflected by the diffractive structure, travels in a different direction from the incident light. Therefore, it can be prevented that a ghost signal is detected by a detection system of the optical pickup device. Further, the diffractive structure can be precisely formed by the electron beam drawing. The method for preparing the fine diffractive structure having fine ring-shaped zones by using the electron beam drawing is disclosed in "OPTICAL DESIGN, Journal of Optics DesignGroup, No. 20, 2000.2.25, pp. 26–31". The optical surface opposite to the plane surface on which the diffractive structure is formed, is a concave refractive surface. When the refractive power of the concave surface has an absolute value which is substantially the same as that of the diffractive power of the diffractive structure and the sign of the refractive power is opposite to that of the diffractive power, the power of the whole system of the aberration compensating optical element can be 0. Therefore, it becomes easy that the aberration compensating optical element is disposed in the parallel light flux.

In the above-described aberration compensating optical element, it is preferable that the paraxial power $P_{\lambda 0}$ of the aberration compensating optical element is substantially zero at the wavelength $\lambda_0$ of the light emitted from the light source. Therefore, it becomes easy that the aberration compensating optical element is disposed in the parallel light flux. In the concrete, wherein the following formulas (29) to (31) are satisfied:

$$P_D > 0 \quad (29)$$

$$P_R < 0 \quad (30)$$

$$-0.9 < P_D/P_R < -1.1 \quad (31).$$

It is preferable that the above-described aberration compensating optical element has a temperature property that when the temperature rises, the paraxial power is changed in a direction of decreasing it, and the following formula (32) is satisfied:

$$P_{T2} < P_{T0} < P_{T1} \quad (32),$$

where $P_{T0}$ is a paraxial power (mm$^{-1}$) of the aberration compensating optical element at a predetermined temperature $T_0$;

$P_{T1}$ is a paraxial power (mm$^{-1}$) of the aberration compensating optical element at a temperature $T_1$ which is lower than the predetermined temperature $T_0$; and $P_{T2}$ is a paraxial power (mm$^{-1}$) of the aberration compensating optical element at a temperature $T_2$ which is higher than the predetermined temperature $T_0$.

Because the aberration compensating optical element satisfies the above formula (32), when the temperature rises, an inclination of an upper marginal ray of the emergent light flux from the aberration compensating optical element is changed in a direction of increasing it as compared with a previous temperature change, that is, in a counterclockwise direction on the basis of the optical axis. This phenomenon has the same effect as a phenomenon that the magnification of the objective lens is changed in a direction of decreasing it. Therefore, in the optical pickup optical device, when the temperature rises, the change in the third-order spherical aberration, which is caused by changing the temperature of the objective lens, can be decreased so as to cancel it by using the aberration compensating optical element with the objective lens having a temperature property that the third-order spherical aberration is changed in an over-corrected direction.

It is preferable that the predetermined temperature $T_0$ is 25° C. and that the temperature difference between $T_0$ and $T_1$ and the temperature difference between $T_0$ and $T_2$ are 30° C.

As an objective lens having a temperature property that the third-order spherical aberration component is changed in an over-corrected direction when the temperature rises, a plastic lens having a single lens structure is exemplified. When the numerical aperture of the plastic lens having a single lens structure increases, the usable temperature range thereof becomes very narrow (the change in the spherical aberration of the plastic lens having a single lens structure, which is caused by the temperature change, is about 5 to 10 times larger than that of the plastic lens having a doublet lens structure, which has the same focal length, image-side numerical aperture, working wavelength and the magnification.) Therefore, a temperature controlling device for controlling the temperature of the plastic lens is specially required. As a result, the increase in the manufacturing cost of the optical pickup device and the complication of the optical pickup device are caused. By using the aberration compensating optical element according to the present invention with a high NA plastic lens having a single lens structure, the usable temperature range of a high NA plastic lens having a single lens structure can be expanded with a simple structure and at a low cost.

It is preferable that at least one ring-shaped zone step having a step distance $\Delta$ (mm) in a direction of an optical axis between adjacent steps of the plurality of ring-shaped zone steps is formed within an effective diameter so that m, defined by following equations:

$$m = INT(Y),$$

$$Y = \Delta \times (n-1)/(\lambda_0 \times 10^{-3}) \quad (33),$$

is an integer except 0 and ±1, where INT(Y) is an integer obtained by rounding Y, $\lambda_0$ is the wavelength (nm) of the light emitted from the light source, and n is a refractive index of the aberration compensating optical element at the wavelength $\lambda_0$ (nm).

The above formula (33) has a meaning that the difference $\Delta$ (mm) in a direction of an optical axis between adjacent steps of the plurality of ring-shaped zone steps of the aberration compensating optical element is determined so that a diffracted light amount of the diffracted light having a diffraction order which is two or more, is larger than those of the diffracted lights having the other diffraction orders, when the incident light flux is diffracted by the diffractive structure formed on the optical surface of the aberration compensating optical element. Thereby, as compared with the case that the difference $\Delta$ is determined so that the first order diffracted light has a maximum diffracted light amount, the minimum value of the interval of the adjacent ring-shaped zone steps is m times larger. Therefore, a light amount loss occurring due to the phase non-matching portion caused by a transfer defect of the ring-shaped zone steps in the molding, is decreased. Because the number of the ring-shaped zone steps is decreased by 1/m, it is possible to shorten the processing time of a die for the molding.

It is preferable that the above-described aberration compensating optical element comprises two diffractive structures having a plurality of ring-shaped zone steps formed on both surfaces. By distributing the power of the diffractive structure to two optical surface, a minimum value of the interval of the adjacent ring-shaped zone steps in the optical axis direction, is larger as compared with the case that the diffractive structure is formed on only one surface. Therefore, a light amount loss occurring due to the phase non-matching portion caused by a transfer defect of the ring-shaped zone steps in the molding, is decreased.

In the above-described aberration compensating optical element, it is preferable that the diffractive structure has such a spherical aberration property that a spherical aberration of an emergent light flux is changed in an under-corrected direction or an over-corrected direction when a wavelength of an incident light flux is shifted to a longer wavelength side; and when the diffractive structure is formed so as to satisfy the following inequality:

$$0.2 \leq |(P_{hf}/P_{hm}) - 2| \leq 6.0 \quad (34),$$

where $P_{hf}$ is a first interval in a direction to perpendicular to an optical axis of the diffractive structure between adjacent steps of the ring-shaped zones of the diffractive structure at a diameter hf which is a half of a maximum effective diameter hm, and $P_{hm}$ is a second interval in the direction to perpendicular to the optical axis of the diffractive structure between adjacent steps of the ring-shaped zones of the diffractive structure at the maximum effective diameter hm.

In case that a short wavelength light source emitting a light having a wavelength of not more than 550 nm, in particular, about 400 nm, the refractive index change of the lens material, which is caused by a slight wavelength change, becomes large. Therefore, when the slight wavelength change is caused, the axial chromatic aberration is caused at the objective lens and the spherical aberration caused at the objective lens is changed. For example, in case of an objective lens having a single lens structure, when the wavelength is shifted to 10 nm longer wavelength side than the design wavelength, the spherical aberration is changed in an over-corrected direction. In case of an objective lens having a doublet structure, when the wavelength is shifted to 10 nm longer wavelength side than the design wavelength, the spherical aberration is changed in an over-corrected direction or in an under-corrected direction, according to a power arrangement in the lens group.

The formula (34) is a condition to compensate the spherical aberration change caused at the objective lens, by a diffracting function of the aberration compensating optical element. If the optical path difference function has only second order coefficient of the optical path difference function (also referred to as "coefficient of a diffractive surface), the condition is $(P_{hf}/P_{hm}) - 2 = 0$. However, in the aberration compensating optical element according to the present invention, higher order coefficients of the optical path difference function are used in order to precisely compensate the spherical aberration change which is caused at the objective lens by a slight wavelength change from the design wavelength, with the diffracting function of the diffractive structure in the aberration compensating optical element. Therefore, it is preferable that the formula $(P_{hf}/P_{hm}) - 2$ has a value apart from 0 to a certain degree. If the formula (34) is satisfied, the above spherical aberration change is decreased so as to excellently cancel it by the diffracting function.

In the above-described aberration compensating optical element, when a wavelength of a light entering the diffractive structure is not more than 550 nm, it is preferable that a diffraction efficiency of the diffractive structure becomes maximal. More preferably, the design wavelength of the objective lens is substantially the same as the wavelength at which the diffraction efficiency becomes maximal.

In accordance with the eighth aspect of the present invention, an optical system for carrying out at least one of a record of information on an information recording surface of an optical information recording medium and a reproduction of information from the information recording surface; comprises:

a light source;

an objective lens having an image-side numerical aperture of not less than 0.75 and comprising at least one plastic lens; and any one of the above-described aberration compensating optical elements, which is disposed on an optical path between the light source and the objective lens.

In accordance with the ninth aspect of the present invention, an optical pickup device for carrying out at least one of a record of information on an information recording surface of an optical information recording medium and a reproduction of information from the information recording surface; comprises:

an optical system comprising: a light source; an objective lens having an image-side numerical aperture of not less than 0.75 and comprising at least one plastic lens; an aberration compensating optical element, which is disposed on an optical path between the light source and the objective lens;

wherein the optical pickup device comprises the above-described optical system as a condensing optical system.

According to the above-described optical system and the optical pickup device, even though a high NA plastic objective lens is used in a high density storage optical pickup system or the like, the change in the spherical aberration occurring at the objective lens, which is caused by the temperature change, can be minimized with a relatively simple structure.

In accordance with the tenth aspect of the present invention, in a recorder and a reproducer, the above-described optical pickup device is provided. It is possible to carry out the record of at least one of a sound and an image and the reproduction of at least one of a sound and an image, respectively.

In this specification, the diffractive surface is a surface having a function of diffracting the incident light flux by providing a relief on a surface of the optical element, for example, a surface of a lens. In case of one surface having a region that the diffraction occurs and a region that the diffraction does not occur, the diffractive surface is a region that the diffraction occurs. The diffractive structure or the diffraction pattern is the region that the diffraction occurs. As a shape of the relief, for example, a plurality of ring-shaped zones which are formed into substantially concentric circles around the optical axis on the surface of the optical element, are known. Further, the plurality of ring-shaped zones have a sectional form in which each ring-shaped zone step has a shape of saw teeth or a shape of steps on the cross section including the optical axis. The shape of the relief includes the above-described shape.

In this specification, the record of information and the reproduction of information are that the information is recorded on the information recording surface of the optical information recording medium and that the information recorded on the information recording surface is reproduced, respectively. The condensing optical system according to the present invention, may be used to carry out the record only or the reproduction only, or to carry out both the record and the reproduction. The condensing optical system may carry out the record for one optical information recording medium and carry out the reproduction for another optical information recording medium. Further, the condensing optical system may carry out the record or the reproduction for one optical information recording medium and carry out both the record and the reproduction for another optical information recording medium. In the specification, the reproduction includes that the information is only read out.

BRIEF DESCRIPTION OF THE DRAWINGS

The present invention will become more fully understood from the detailed description given hereinbelow and the accompanying drawings which are given by way of illustration only, and thus are not intended as a definition of the limits of the present invention, and wherein;

FIG. 12A is a side view showing an aberration compensating optical element shown in FIG. 11, and FIG. 12B is a plan view showing an aberration compensating optical element shown in FIG. 11, which is viewed in the direction of the arrow A;

FIG. 13 is a view showing an example of an objective lens in which the axial chromatic aberration is compensated by the aberration compensating optical element according to Examples 4 to 6 of the present invention, and is an optical path diagram of the objective lens;

PREFERRED EMBODIMENT OF THE INVENTION

Figure 1:
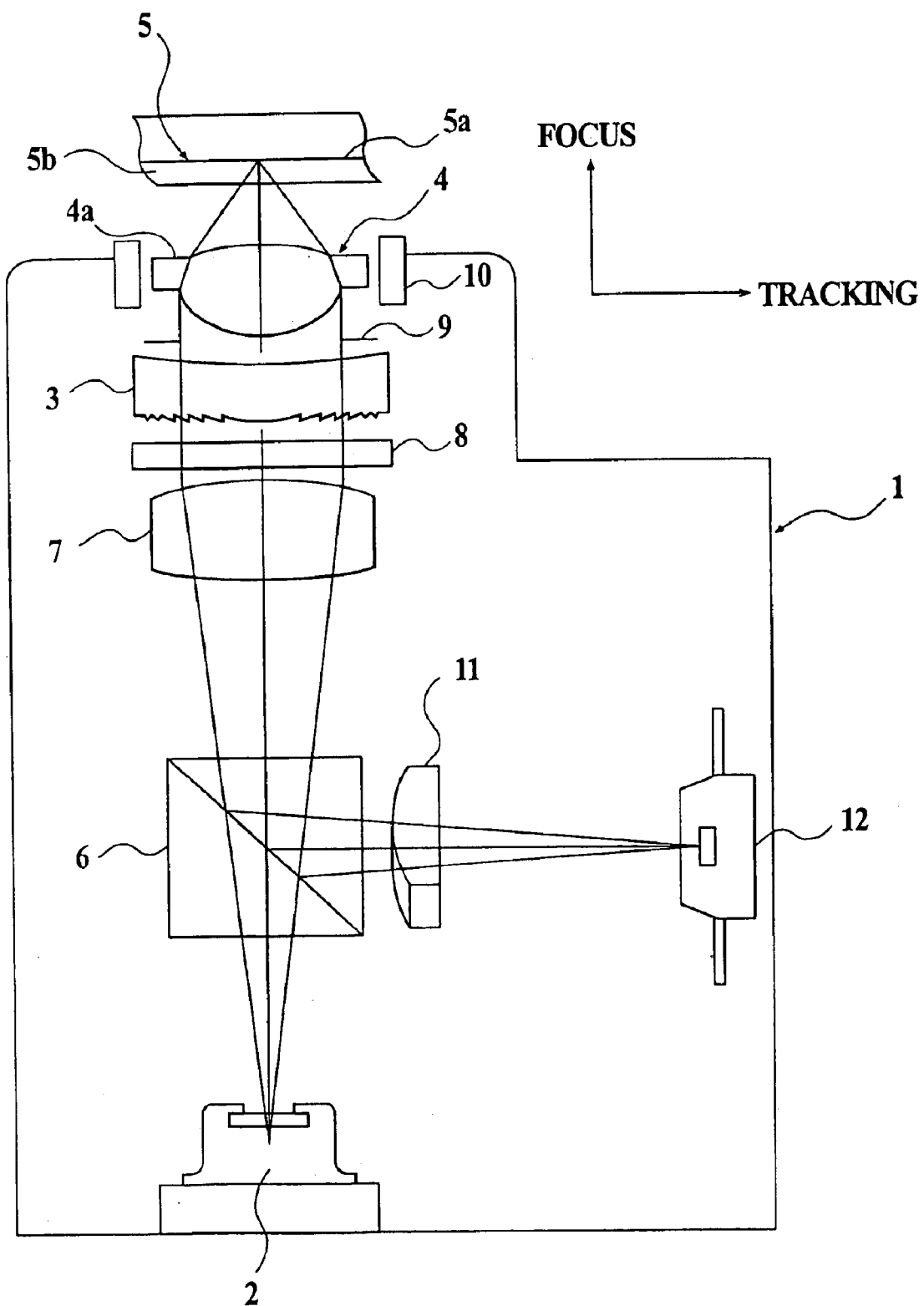
FIG. 1 is a view for schematically showing on optical pickup device according to the first embodiment of the present invention.

First Embodiment:

Hereinafter, the first embodiment of the present invention will be explained with reference to the drawings. FIG. 1 is a view for schematically showing on optical pickup device including a condensing optical system for optical pickup device according to the first embodiment of the present invention. FIG. 2A is a side view showing an aberration compensating optical element shown in FIG. 1, and FIG. 2B is a plan view which is viewed in the direction of the arrow A.

The optical pickup device 1 shown in FIG. 1 comprises a semiconductor laser 2 as a light source, a hybrid refractive-diffractive aberration compensating optical element 3 and an objective lens 4. The semiconductor laser 2 is a GaN blue-violet laser for emitting the light flux having a wavelength of about 400 nm. As a light source for emitting the light flux having a wavelength of about 400 nm, not only the above GaN blue-violet laser but also an SHG blue-violet laser may be used.

Figure 2B:
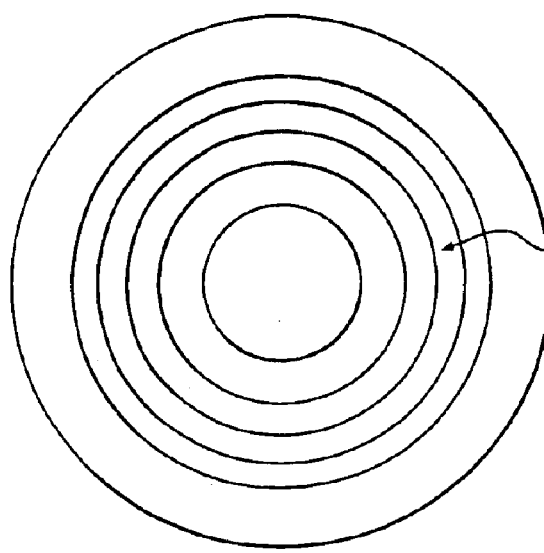
FIG. 2B is a plan view showing an aberration compensating optical element shown in FIG. 1, which is viewed in the direction of the arrow A.
Figure 2A:
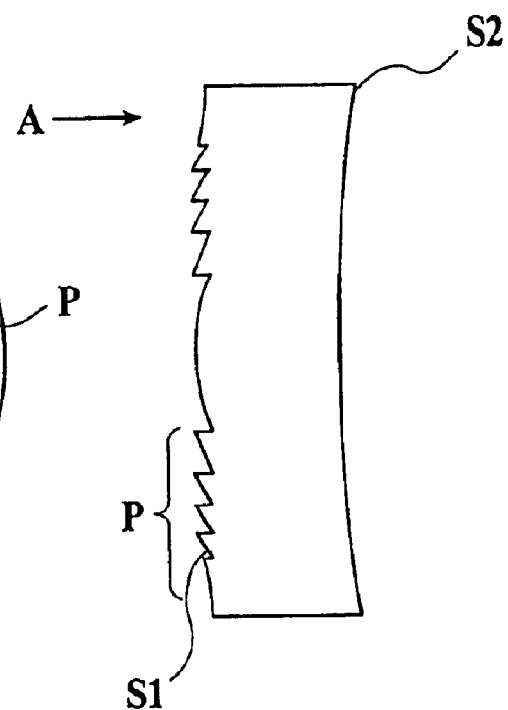
FIG. 2A is a side view showing an aberration compensating optical element shown in FIG. 1.

As shown in FIGS. 2A and 2B, a diffraction pattern p having the form of substantially concentric circles is provided on a surface S1 which is on the semiconductor laser 2 side of the aberration compensating optical element 3, and which is a plane optical surface. The power of the diffraction pattern p is determined so as to satisfy the formula (15). The intervals of the diffraction pattern p, in the direction perpendicular to the optical axis thereof, are determined by the formula (12). Further, a surface S2 which is on the objective lens 4 side of the aberration compensating optical element 3, is a concave surface having a negative refractive power. By setting the absolute value of the power of the diffraction pattern and that of the power of the concave surface so as to be equal to each other, the whole power of aberration compensating optical element 3 becomes 0.

The diffraction pattern having the form of substantially concentric circles may be provided on a surface which is on the objective lens 4 side of the aberration compensating optical element 3 or on the both surfaces which are on the light source 2 side and the objective lens 4 side. In this embodiment, the whole power of the aberration compensating optical element 3 is 0. However, the whole power of the aberration compensating optical element 3 may be positive or negative. Further, in this embodiment, the diffraction pattern of the aberration compensating optical element 3 is formed in substantially concentric circles around the optical axis thereof. However, other diffraction patterns may be provided.

In the optical pickup device 1 of FIG. 1, the aberration compensating optical element 3 is constructed by using one lens. However, the aberration compensating optical element 3 may be constructed by using a plurality of lenses as long as the structure thereof does not depart from the scope of the present invention.

Further, in the optical pickup device 1 of FIG. 1, the aberration compensating optical element 3 is disposed as an element which is separated from the objective lens 4. However, the aberration compensating optical element 3 may be united with the objective lens 4 by using a lens frame, an adhesive or the like. In this case, because the tracking thereof is unitedly controlled with a two-axis actuator 10 by moving the aberration compensating optical element 3 and the objective lens 4 together, an excellent tracking property can be obtained.

The objective lens 4 of FIG. 1 is one for condensing the emergent light flux from the aberration compensating optical element 3, on an information recording surface 5a of the optical disk 5 within the diffraction limited. The objective lens 4 is composed of one lens and has at least one aspherical surface. The objective lens 4 comprises a flange portion 4a having a surface extending perpendicularly to the optical axis. The objective lens 4 can be accurately attached to the optical pickup device 1 by the flange portion 4a. It is preferable that the numerical aperture on the optical disk 5 side of the objective lens 4 is not less than 0.65. More preferably, the numerical aperture is not less than 0.75. In this embodiment, the objective lens 4 is composed of one lens. However, the objective lens may be composed of two or more lenses.

A divergent light flux emitted from the semiconductor laser 2 transmits through a polarization beam splitter 6. The light flux passes through a collimate lens 7 and a quarter-wave plate 8 to become a circularly polarized parallel light flux. After the light flux transmits through the aberration compensating optical element 3 and a stop 9, the light flux becomes a spot formed by the objective lens 4 on the information recording surface 5a through a transparent substrate 5b of the high density storage optical desk 5. The objective lens 4 is focused and tracked by a two-axis actuator 10 disposed therearound.

The reflected light flux modulated by a information pit on the information recording surface 5a, transmits through the objective lens 4, the aberration compensating optical element 3, the quarter-wave plate 8 and the collimate lens 7. Then, the light flux becomes a converged light flux, and is reflected by the polarization beam splitter 6. By transmitting the light flux through the cylindrical lens 11, the astigmatism is given and the light flux is converged at a photo-detector 12. Then, the information recorded on the optical disk 5 can be read by using an output signal of the photo-detector 12.

In this embodiment, because the diffraction pattern having the form of substantially concentric circles is provided on the optical surface of the aberration compensating optical element 3 as described above, the axial chromatic aberration having an opposite sign to the axial chromatic aberration caused at the objective lens 4 and having the same absolute value as the axial chromatic aberration caused at the objective lens 4, is generated by the aberration compensating optical element 3 for the oscillation wavelength of the semiconductor laser 2. Therefore, the light flux emitted from the semiconductor laser 2 can be condensed on the information recording surface 5a of the optical disk 5 without causing the axial chromatic aberration by transmitting the light flux through the aberration compensating optical element 3 and the objective lens 4.

The optical pickup device 1 shown in FIG. 1, can be provided in a recorder and a reproducer for at least one of a sound and an image, for example, a player or a drive which is compatible with an optical information recording medium, such as CD, CD-R, CD-RW, CD-Video, CD-ROM, DVD, DVD-ROM, DVD-RAM, DVD-R, DVD–RW, DVD+RW, MD or the like, or an AV apparatus, a personal computer or other information terminals into which the player or the drive is incorporated, or the like.

EXAMPLES

Figure 3:
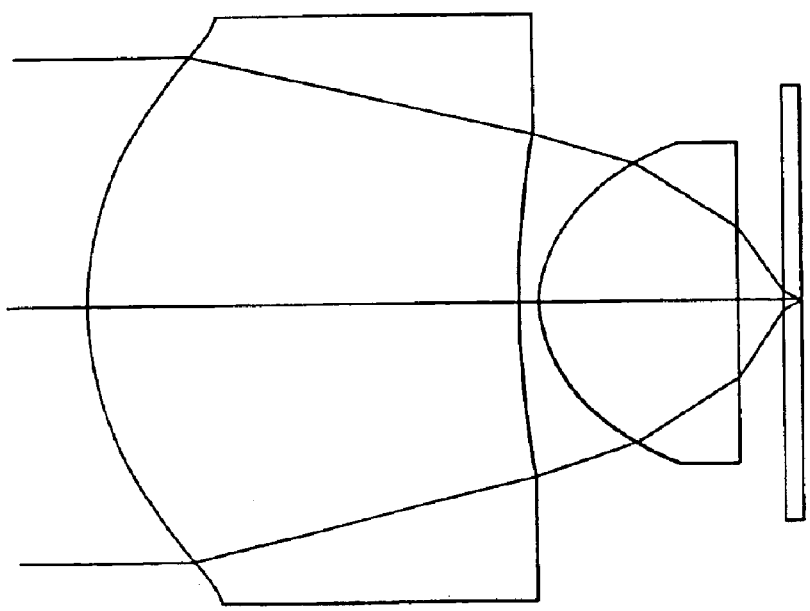
FIG. 3 is a view showing an example of an objective lens which causes the axial chromatic aberration to be compensated by the aberration compensating optical element according to Examples 1 to 3 of the present invention, and is an optical path diagram of the objective lens.
Figure 4:
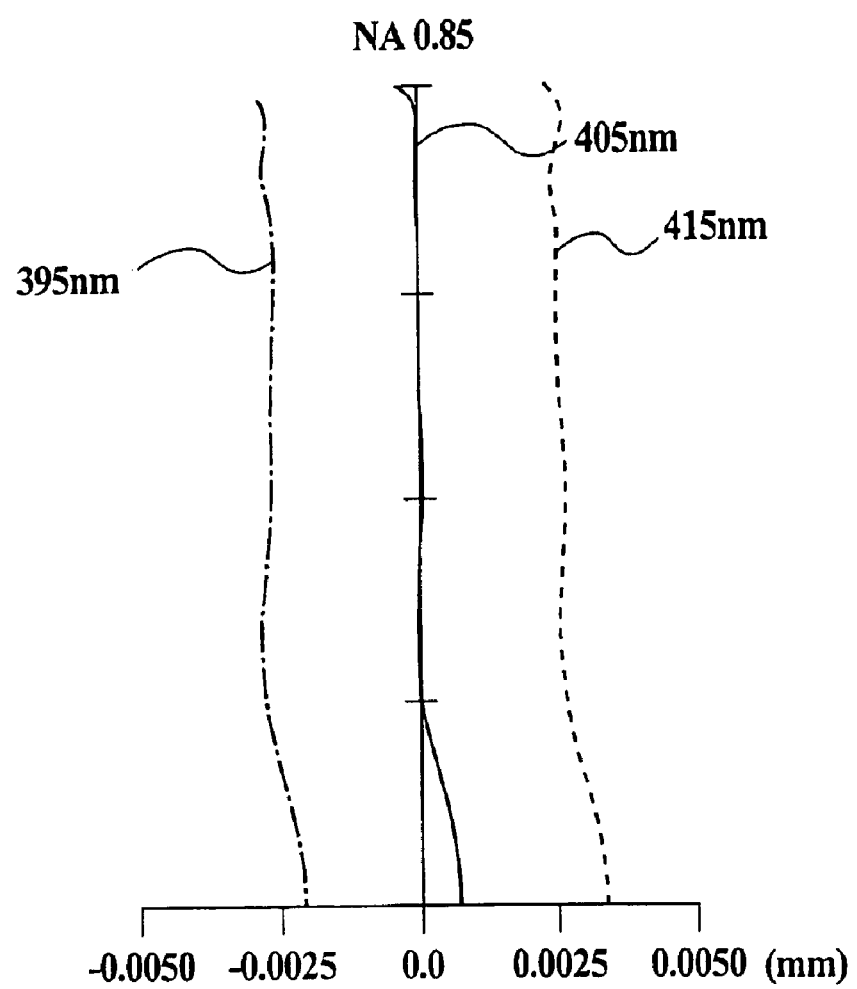
FIG. 4 is a graph showing the spherical aberration and the axial chromatic aberration of the objective lens shown in FIG. 3 at the wavelength of 405±10 nm.

In FIGS. 3 and 4, an example of the objective lens which causes the axial chromatic aberration to be compensated by the aberration compensating optical element according to the present invention, is shown. FIG. 3 is an optical path diagram of the objective lens (focal length 1.76 mm, image-side numerical aperture 0.85) which causes the axial chromatic aberration to be compensated by the aberration compensating optical element according to the present invention. The objective lens is made of olefin resin having the Abbe constant of 56.5 at the d-line. Further, FIG. 4 is a graph showing the spherical aberration and the axial chromatic aberration of the objective lens at the wavelength of 405±10 nm. FIG. 4 shows that when the wavelength is shifted to the long wavelength side by 10 nm, the focal point is shifted to the over side about 3 μm.

Next, Examples 1 to 3 of the optical system for an optical pickup device according to the present invention, will be explained. When the optical axis direction is "X-axis", the height in the direction perpendicular to the optical axis is "h", and the radius of curvature of the refractive surface is "r", they are represented by the following formula (35).

$$X = \frac{h^2/r}{1+\sqrt{1-(1+\kappa)h^2/r^2}} + \sum_{i=2} A_{2i}h^{2i} \tag{35}$$

where $\kappa$ is the coefficient of circular cone and $A_{2i}$ is the coefficient of aspheric surface.

The diffractive surface having ring-shaped zones provided on the lens according to the present examples, can be represented by the following formula (36) when the optical path difference function is $\Phi b$.

$$\Phi_b = n \sum_{j=1} b_{2j}h^{2j} \tag{36}$$

where n is the diffraction order of the diffracted light having the maximum diffracted light amount among the diffracted lights generated by the diffractive surface, h is the height perpendicular to the optical axis, and $b_{2j}$ is the coefficient of the optical path difference function.

Example 1

Figure 5:
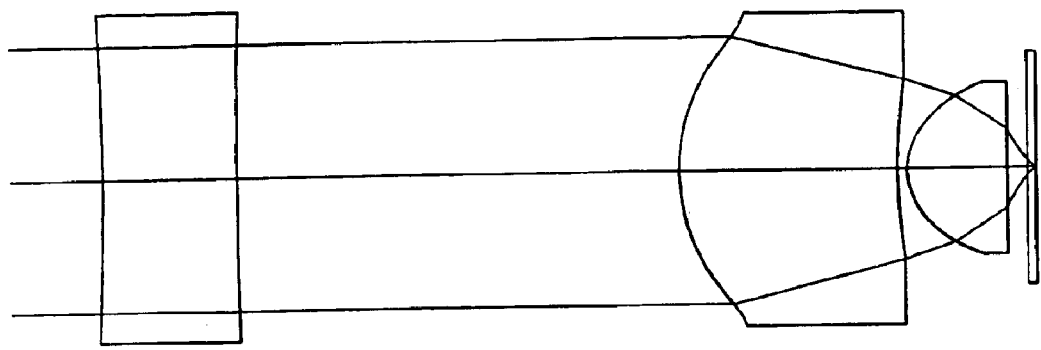
FIG. 5 is an optical path diagram of the optical system for the optical pickup device according to Example 1.

In Table 1, the data relating to the optical system for the optical pickup device according to Example 1, are shown. In FIG. 5, the optical path diagram of the optical system for the optical pickup device according to Example 1, is shown. In Table 1, r is the radius of curvature, d is the surface interval, $N_\lambda$ refractive index at the wavelength of 405 nm, and $v_d$ is the Abbe constant.

TABLE 1

| Surface No. | r (mm) | d (mm) | $N_\lambda$ | $v_d$ | Note |
|---|---|---|---|---|---|
| 0 |  | ∞ |  |  | Light source |
| 1 | −27.620 | 1.500 | 1.52491 | 56.5 | Aberration compensating optical element |
| 2 | 28.168 | 5.000 |  |  |  |
| 3 | 2.074 | 2.400 | 1.52491 | 56.5 | Objective lens |
| 4 | 8.053 | 0.100 | 1.52491 | 56.5 |  |
| 5 | 0.863 | 1.100 |  |  |  |
| 6 | ∞ | 0.240 |  |  |  |
| 7 | ∞ | 0.100 | 1.61949 | 30.0 | Transparent substrate |
| 8 | ∞ |  |  |  |  |

Coefficients of aspherical surface

|  | First surface | Second surface | Third surface | Fourth surface | Fifth surface |
|---|---|---|---|---|---|
| $\kappa$ | −5.4091E+00 | 1.2966E+00 | −1.2955E−01 | 4.7554E+01 | −7.1425E−01 |
| $A_4$ | −1.1312E−05 | −4.2412E−07 | −3.7832E−03 | 1.3641E−02 | 1.3647E−01 |
| $A_6$ |  |  | 5.1667E−04 | −2.9201E−02 | −5.3414E−02 |
| $A_8$ |  |  | −1.1780E−03 | −9.3339E−03 | 3.0269E−01 |
| $A_{10}$ |  |  | −2.0628E−04 | 3.3011E−02 | −1.6898E−01 |
| $A_{12}$ |  |  | 2.5941E−05 | −2.2626E−02 |  |
| $A_{14}$ |  |  | 1.4917E−04 |  |  |
| $A_{16}$ |  |  | −5.1578E−05 |  |  |

Coefficients of diffractive surface

|  | First surface | Second surface |
|---|---|---|
| $b_2$ | −4.7281E−03 | −4.6816E−03 |

In Example 1, by making the aberration compensating optical element of olefin resin and forming the diffractive surfaces on the both optical surfaces which are on the light source side and the objective lens side, the axial chromatic aberration caused at the objective lens was compensated. Further, the total power of each optical surface was 0 by forming each optical surface so as to have the negative refractive power and the diffractive power having the same absolute value as the refractive power. Therefore, the emergent light flux diameter was not changed in comparison with the incident light flux diameter. Further, the coefficient of the optical path difference function shown in Table 1, was determined so that the second-order diffracted light had a maximum diffracted light amount.

Figure 6:
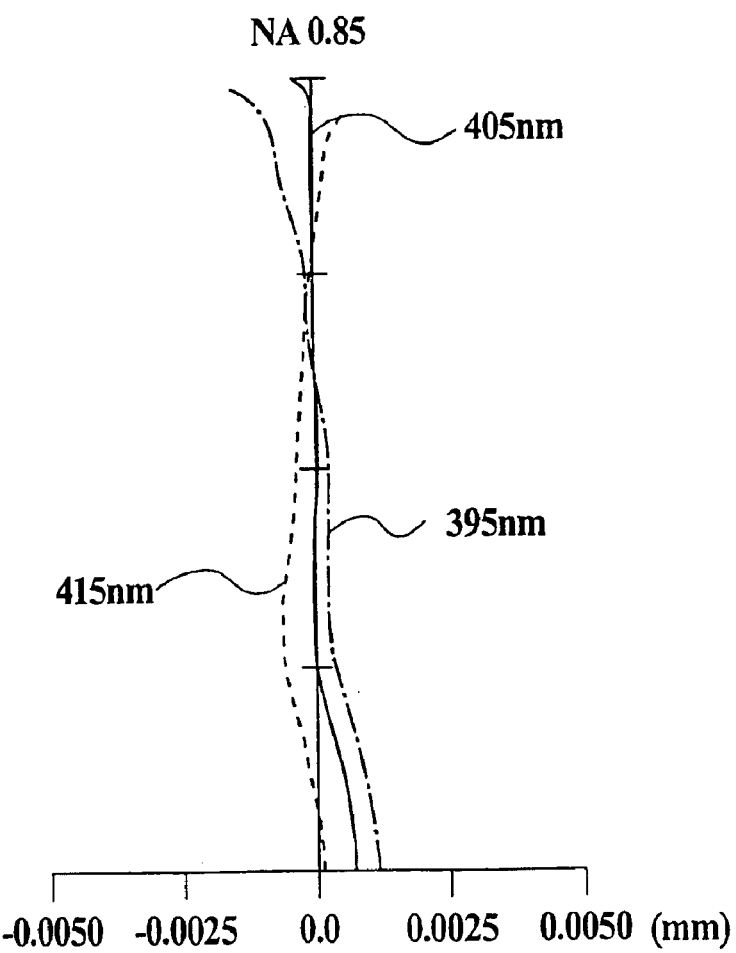
FIG. 6 is a graph showing the spherical aberration and the axial chromatic aberration of the optical system for the optical pickup device according to Example 1 at the wavelength of 405±10 nm.

FIG. 6 is a graph showing the spherical aberration and the axial chromatic aberration of the optical system for the optical pickup device according to Example 1 at the wavelength of 405±10 nm. FIG. 6 shows that the focal point is hardly shifted regardless of the wavelength.

The diffractive power of the aberration compensating optical element was determined so that the axial chromatic aberration caused in the compound system including the objective lens was over-corrected. Further, the aberration remained in the lens so that the spherical aberration caused in the compound system was over-corrected on the long wavelength side and was under-corrected on the short wavelength side. The shift of the best image point, which was caused by changing the wavelength, was minimized by crossing the graph of the spherical aberration of the reference wavelength and ones of the spherical aberrations on the long wavelength side and the short wavelength side. Therefore, the defocus component of the wavefront aberration, which was caused by the mode hopping of +1 nm, could be decreased to 0.002λrms (calculated value).

In case that the chromatic aberration caused in the compound system is compensated as described above, the interval of the diffracting ring-shaped zone on the aberration compensating optical element can be expanded in comparison with the case that the shift of the best image point, which is caused by changing the wavelength, is minimized by almost perfectly compensating the axial chromatic aberration of the compound system and by almost perfectly compensating the spherical aberration on the long wavelength side and the spherical aberration on the short wavelength side. Therefore, the light amount loss caused by the form error of the diffracting ring-shaped zone structure in the manufacture thereof can be minimized.

Example 2

Figure 7:
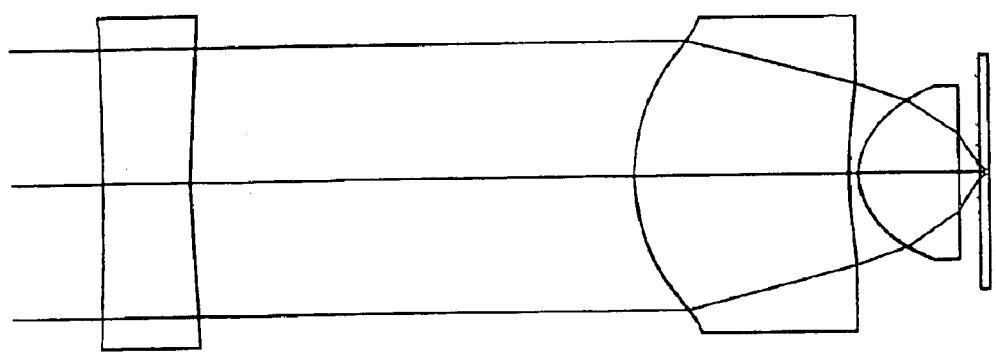
FIG. 7 is an optical path diagram of the optical system for the optical pickup device according to Example 2.

Table 2, the data relating to the optical system for the optical pickup device according to Example 2, are shown. In FIG. 7, the optical path diagram of the optical system for the optical pickup device according to Example 2, is shown. In Table 2, r is the radius of curvature, d is the surface interval, $N_\lambda$ is the refractive index at the wavelength of 405 nm, and $v_d$ is the Abbe constant.

TABLE 2

| Surface No. | r (mm) | d (mm) | $N_\lambda$ | $v_d$ | Note |
|---|---|---|---|---|---|
| 0 | | ∞ | | | Light source |
| 1 | ∞ | 1.000 | 1.52491 | 56.5 | Aberration compensating optical element |
| 2 | 14.165 | 5.000 | | | |
| 3 | 2.074 | 2.400 | 1.52491 | 56.5 | Objective lens |
| 4 | 8.053 | 0.100 | 1.52491 | 56.5 | |
| 5 | 0.863 | 1.100 | | | |

TABLE 2-continued

| | | | | | |
|---|---|---|---|---|---|
| 6 | ∞ | 0.240 | | | |
| 7 | ∞ | 0.100 | 1.61949 | 30.0 | Transparent substrate |
| 8 | ∞ | | | | |

Coefficients of aspherical surface

| | Second surface | Third surface | Fourth surface | Fifth surface |
|---|---|---|---|---|
| κ | −1.0003E+00 | −1.2955E−01 | 4.7554E+01 | −7.1425E−01 |
| $A_4$ | −1.0589E−04 | −3.7832E−03 | 1.3641E−02 | 1.3647E−01 |
| $A_6$ | | 5.1667E−04 | −2.9201E−02 | −5.3414E−02 |
| $A_8$ | | −1.1780E−03 | −9.3339E−03 | 3.0269E−01 |
| $A_{10}$ | | −2.0628E−04 | 3.3011E−02 | −1.6898E−01 |
| $A_{12}$ | | 2.5941E−05 | −2.2626E−02 | |
| $A_{14}$ | | 1.4917E−04 | | |
| $A_{16}$ | | −5.1578E−05 | | |

Coefficients of diffractive surface

| | First surface |
|---|---|
| $b_2$ | −9.0435E−03 |
| $b_4$ | 3.1856E−05 |

In Example 2, by making the aberration compensating optical element of olefin resin and forming a diffractive surface which is a macroscopically plane surface, on the optical surface of the light source side, that is, preparing the diffractive structure on the optical surface of the light source side so that the diffractive structure comprises a plurality of ring-shaped zone steps having the form of the substantially concentric circles which are formed on a plane surface, the axial chromatic aberration caused at the objective lens was compensated. Further, the power of the whole system in the aberration compensating optical element was 0 by forming the optical surface of the objective lens side so as to have the negative refractive power and by forming the optical surface of the light source side so as to have the diffractive power having the same absolute value as the refractive power. Further, the coefficient of the optical path difference function shown in Table 2, was determined so that the second-order diffracted light had a maximum diffracted light amount.

Figure 8:
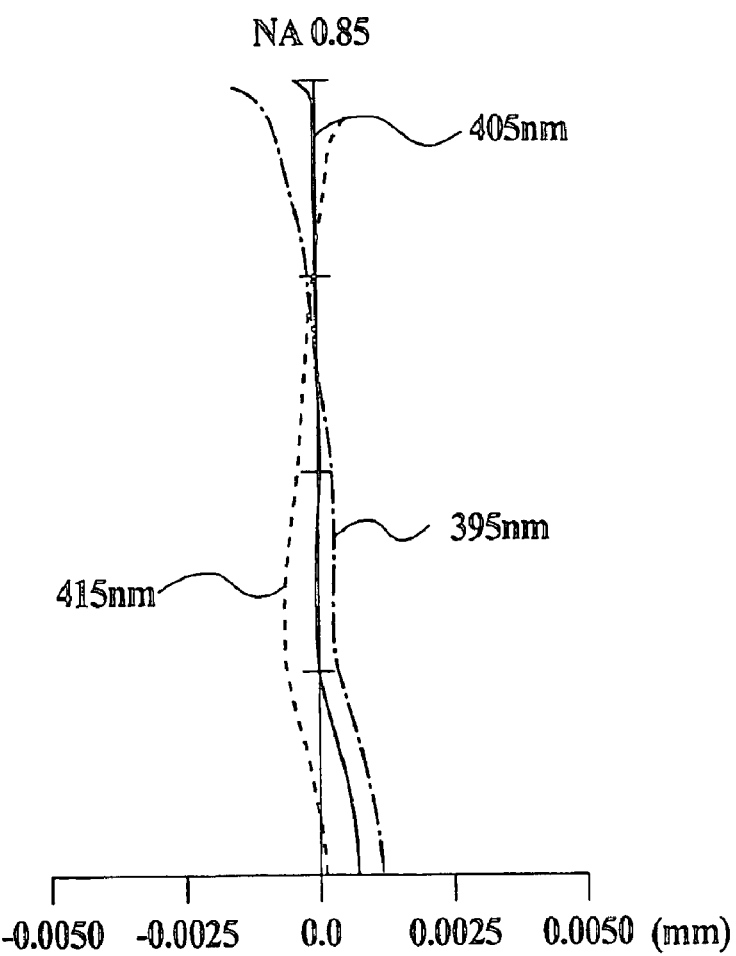
FIG. 8 is a graph showing the spherical aberration and the axial chromatic aberration of the optical system for the optical pickup device according to Example 2 at the wavelength of 405±10 nm.

FIG. 8 is a graph showing the spherical aberration and the axial chromatic aberration of the optical system for the optical pickup device according to Example 2 at the wavelength of 405±10 nm. FIG. 8 shows that the focal point is hardly shifted regardless of the wavelength.

Example 3

Figure 9:
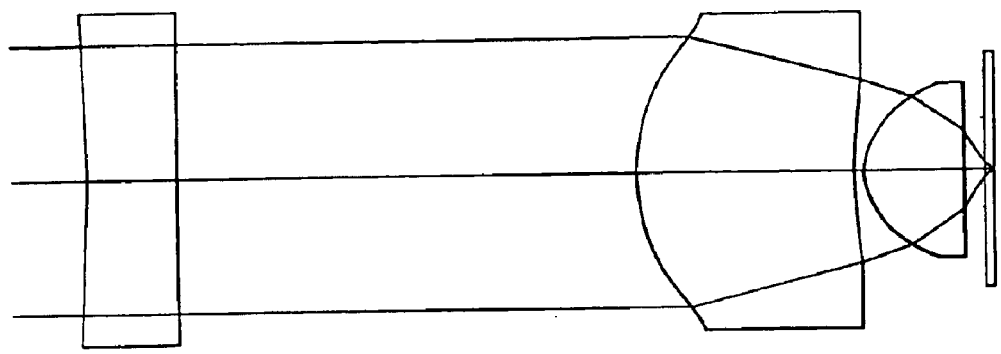
FIG. 9 is an optical path diagram of the optical system for the optical pickup device according to Example 3.

In Table 3, the data relating to the optical system for the optical pickup device according to Example 3, are shown. In FIG. 9, the optical path diagram of the optical system for the optical pickup device according to Example 3, is shown. In Table 3, r is the radius of curvature, d is the surface interval, $N_\lambda$ is the refractive index at the wavelength of 405 nm, and $v_d$ is the Abbe constant.

TABLE 3

| Surface No. | r (mm) | d (mm) | $N_\lambda$ | $v_d$ | Note |
|---|---|---|---|---|---|
| 0 | | ∞ | | | Light source |
| 1 | −17.495 | 1.000 | 1.52491 | 56.5 | Aberration compensating optical element |
| 2 | ∞ | 5.000 | | | |
| 3 | 2.074 | 2.400 | 1.52491 | 56.5 | Objective lens |

TABLE 3-continued

| 4 | 8.053 | 0.100 | | | |
|---|---|---|---|---|---|
| 5 | 0.863 | 1.100 | 1.52491 | 56.5 | |
| 6 | ∞ | 0.240 | | | |
| 7 | ∞ | 0.100 | 1.61949 | 30.0 | Transparent substrate |
| 8 | ∞ | | | | |

Coefficients of aspherical surface

| | First surface | Third surface | Fourth surface | Fifth surface |
|---|---|---|---|---|
| κ | 2.7605E+01 | −1.2955E−01 | 4.7554E+01 | −7.1425E−01 |
| $A_4$ | 1.9423E−03 | −3.7832E−03 | 1.3641E−02 | 1.3647E−01 |
| $A_6$ | −1.4942E−03 | 5.1667E−04 | −2.9201E−02 | −5.3414E−02 |
| $A_8$ | | −1.1780E−03 | −9.3339E−03 | 3.0269E−01 |
| $A_{10}$ | | −2.0628E−04 | 3.3011E−02 | −1.6898E−01 |
| $A_{12}$ | | 2.5941E−05 | −2.2626E−02 | |
| $A_{14}$ | | 1.4917E−04 | | |
| $A_{16}$ | | −5.1578E−05 | | |

Coefficients of diffractive surface

| | First surface |
|---|---|
| $b_2$ | −7.5000E−03 |
| $b_4$ | 3.3173E−04 |
| $b_6$ | −4.0384E−04 |
| $b_8$ | 3.8224E−06 |
| $b_{10}$ | −1.0509E−06 |

In Example 3, by making the aberration compensating optical element of olefin resin and forming the diffractive surfaces on the optical surfaces of the light source side, the axial chromatic aberration caused at the objective lens was compensated. Further, the power of the whole system in the aberration compensating optical element was 0 by forming the optical surface of the light source side so as to have the negative refractive power and the diffractive power having the same absolute value as the refractive power, and by forming the optical surface of the light source side so as to be a plane surface. Further, the coefficient of the optical path difference function shown in Table 3, was determined so that the second-order diffracted light had a maximum diffracted light amount. In this example, the terms of the optical path difference function, to which the second or higher order coefficients were given, were used. The diffractive-surface had a spherical aberration property to shift the spherical aberration in an under-corrected direction when the wavelength was shifted to the long wavelength side. Then, the change in the spherical aberration, which was caused at the objective lens when the wavelength was shifted to the long wavelength side, was cancelled by the spherical aberration of the diffractive surface.

Figure 10:
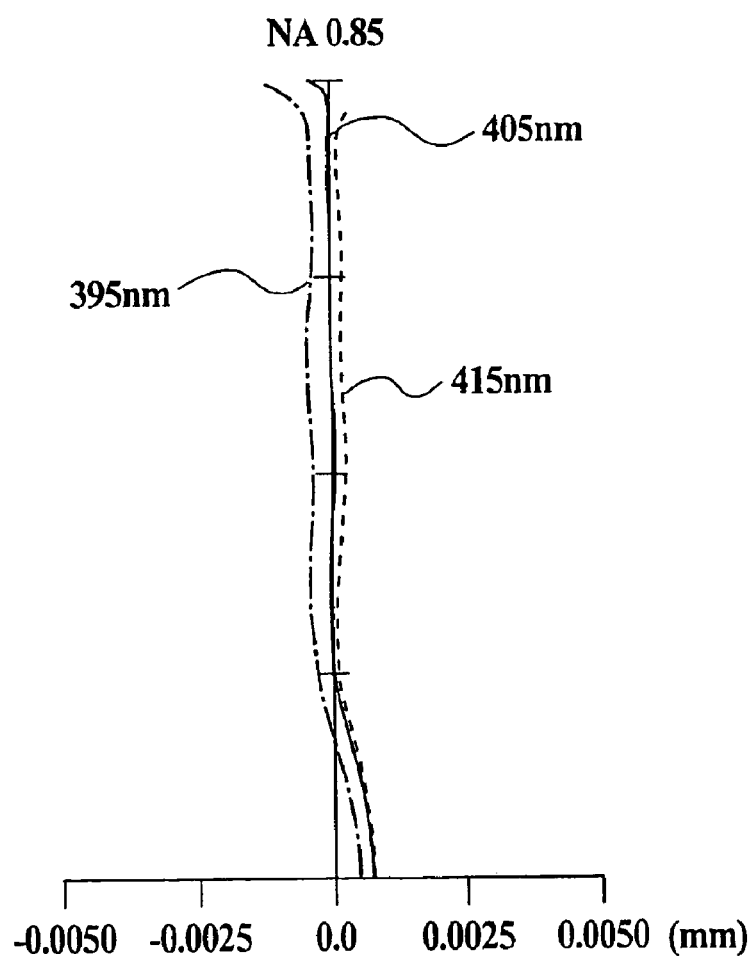
FIG. 10 is a graph showing the spherical aberration and the axial chromatic aberration of the optical system for the optical pickup device according to Example 3 at the wavelength of 405±10 nm.

FIG. 10 is a graph showing the spherical aberration and the axial chromatic aberration of the optical system for the optical pickup device according to Example 3 at the wavelength of 405±10 nm. FIG. 10 shows that the focal point is hardly shifted regardless of the wavelength.

Second Embodiment:

The inventor and the like proposed an objective lens having a doublet lens structure as a plastic objective lens which is suitable for a system for a high density optical information recording medium, such as a high density DVD system, as disclosed in Japanese Patent Application No. Tokugan 2001-256422.

Figure 27:
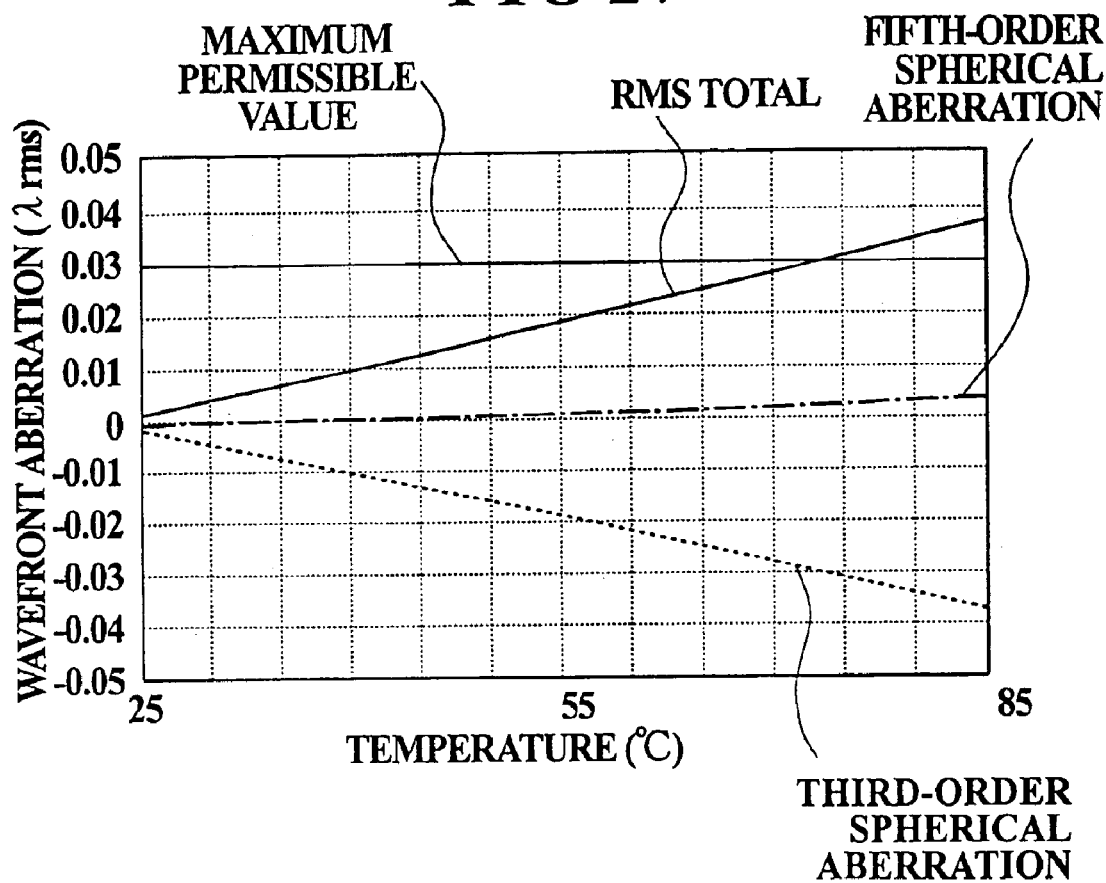
FIG. 27 is a view showing the spherical aberration change of the plastic objective lens having a doublet lens structure according to an earlier technology of the inventor, as a function of the temperature change, wherein the plastic objective lens has an NA of 0.85, a design reference wavelength of 405 nm, a focal length of 1.76 and a design reference temperature of 25° C.

However, in a high NA plastic objective lens having the NA of about 0.85, when the temperature changes, the change in the spherical aberration, which is caused by the refractive index change of plastic, is large because it increases in proportion to the fourth power of NA. Therefore, in practical use, the above change becomes a significant problem. As an example of the spherical aberration change, FIG. 27 shows the spherical aberration change of the plastic objective lens having a doublet lens structure, as a function of the temperature change, wherein the plastic objective lens has an NA of 0.85, a design reference wavelength of 405 nm, a focal length of 1.76 and a design reference temperature of 25° C. In Table 4, r is the radius of curvature, d is the surface interval, and $N_{404}$, $N_{405}$ and $N_{406}$ are the refractive indexes at the wavelength of 404 nm, 405 nm and 406 nm, respectively.

TABLE 4

| Surface No. | r (mm) | d (mm) | $N_{404}$ | $N_{405}$ | $N_{406}$ | Note |
|---|---|---|---|---|---|---|
| 0 | | ∞ | | | | Light source |
| 1 | 1.959 | 2.450 | 1.52485 | 1.52469 | 1.52454 | Objective lens |
| 2 | 10.207 | 0.050 | | | | |
| 3 | 0.892 | 1.100 | 1.52485 | 1.52469 | 1.52454 | |
| 4 | ∞ | 0.201 | | | | |
| 5 | ∞ | 0.100 | 1.61990 | 1.61950 | 1.61909 | Transparent substrate |
| 6 | ∞ | | | | | |

Coefficients of aspherical surface

| | First surface | Second surface | Third surface |
|---|---|---|---|
| κ | −1.6847E−01 | 8.3955E+01 | −7.4973E−01 |
| $A_4$ | −4.8527E−03 | 5.4087E−03 | 1.2350E−01 |
| $A_6$ | −3.6816E−04 | −6.1028E−03 | 1.6589E−02 |
| $A_8$ | −3.6905E−04 | −1.4958E−02 | 1.8042E−01 |
| $A_{10}$ | −2.1477E−04 | 1.9993E−02 | −1.0532E−01 |
| $A_{12}$ | −6.5049E−05 | −1.7848E−02 | |
| $A_{14}$ | 1.3300E−04 | | |
| $A_{16}$ | −4.2576E−05 | | |

In order to record information on an optical disk or reproduce information from an optical disk, it is required that the performance of the whole optical system in a pickup device satisfies Marechal's limitation that the wavefront aberration is not more than 0.07λrms where λ is the wavelength. Because not only an objective lens but also other optical elements, for example, a collimator, a prism and the like are included in a practical optical system for an optical pickup device, the upper limit of the wavefront aberration, which is permissible for the objective lens, becomes about 0.03λrms. The operation guarantee temperature of an optical disk player is about 85° C. However, at the temperature of 85° C., the wavefront aberration of the objective lens exceeds 0.03λrms as shown in FIG. 27. Therefore, there is some possibility that the record of information on an optical disk or the reproduction of information from an optical disk cannot be stably carried out.

From formula (1), the upper limit of the axial chromatic aberration, which is permissible for the objective lens used in a high density optical pickup system, is calculated. From formula (1), when the wavelength of a light to be used is 405 nm, in order for the wavelength aberration to satisfy not more than 0.03λrms, a maximum amount of defocus (axial chromatic aberration) $\Delta fB_{max}$ is $$\Delta fB_{MAX} = 0.117 \ (\mu m) \tag{37}$$

Figure 28:
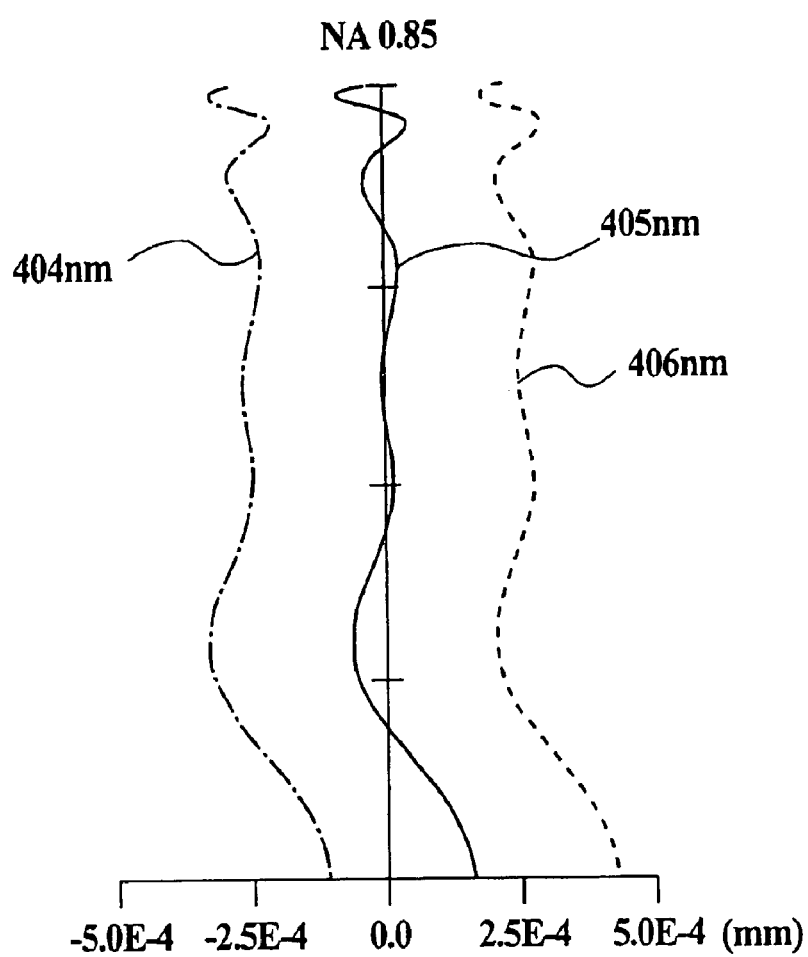
FIG. 28 is a graph showing the spherical aberration and the axial chromatic aberration of the objective lens according to Table 4 at the wavelength of 405±1 nm.

FIG. 28 is a graph showing the spherical aberration and the axial chromatic aberration of the objective lens according to Table 4 at the wavelength of 405±1 nm. In case of a blue-violet semiconductor laser light source, it is discussed that the wavelength is shifted about 1 nm by the mode hopping. As shown in FIG. 28, in this objective lens, when the wavelength is shifted from 405 nm to 406 nm, the axial chromatic aberration of about 0.25 $\mu$m is caused. As a result, the axial chromatic aberration exceeds 0.117 $\mu$m which is the upper limit of the axial chromatic aberration, which is permissible for the objective lens.

Hereinafter, the second embodiment of the present invention will be explained with reference to the drawings.

Figure 11:
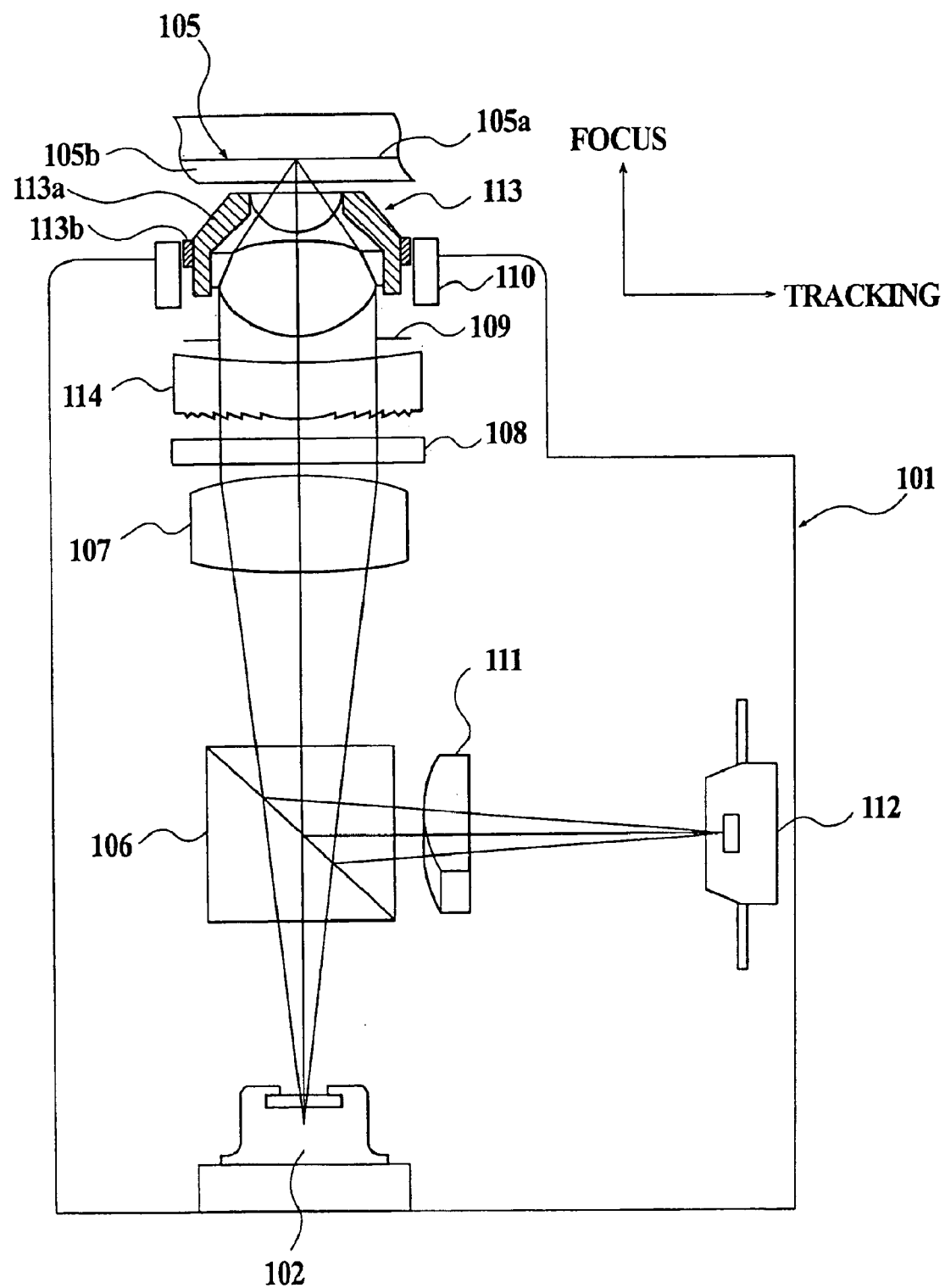
FIG. 11 is a schematic view for showing on optical pickup device according to the second embodiment of the present invention.

FIG. 11 is a view for schematically showing on optical pickup device including an optical system for optical pickup device according to the second embodiment of the present invention. FIG. 12A is a side view showing an aberration compensating optical element shown in FIG. 11, and FIG. 12B is a plan view which is viewed in the direction of the arrow A.

The optical pickup device 101 shown in FIG. 11 comprises a semiconductor laser 102 as a light source, a hybrid refractive-diffractive aberration compensating optical element 114 and an objective lens 113. The semiconductor laser 102 is a GaN blue-violet laser for emitting the light flux having a wavelength of about 400 nm. As a light source for emitting the light flux having a wavelength of about 400 nm, not only the above GaN blue-violet laser but also an SHG blue-violet laser may be used.

As shown in FIGS. 12A and 12B, a diffraction pattern p having the form of substantially concentric circles is provided on a surface S11 which is on the semiconductor laser 102 side of the aberration compensating optical element 114, and which is a plane optical surface. Further, a surface S12 which is on the objective lens 113 side of the aberration compensating optical element 114, is a concave surface having a negative refractive power. By setting the absolute value of the power of the diffraction pattern and that of the power of the concave surface so as to be equal to each other, the whole power of aberration compensating optical element 114 becomes 0.

The diffraction pattern having the form of substantially concentric circles may be provided on a surface which is on the objective lens 113 side of the aberration compensating optical element 114 or on the both surfaces which are on the light source 102 side and the objective lens 113 side. In this embodiment, the whole power of the aberration compensating optical element 114 is 0. However, the whole power of the aberration compensating optical element 114 may be positive or negative. Further, in this embodiment, the diffraction pattern of the aberration compensating optical element 114 is formed in substantially concentric circles around the optical axis thereof. However, other diffraction patterns may be provided.

In the optical pickup device 101 of FIG. 11, the aberration compensating optical element 104 is disposed as an element which is separated from the objective lens 103. However, the aberration compensating optical element 104 may be united with the objective lens 103 by using a lens frame, an adhesive or the like. In this case, because the tracking thereof is unitedly controlled with a two-axis actuator 110 by moving the aberration compensating optical element 104 and the objective lens 103 together, an excellent tracking property can be obtained.

The objective lens 113 is one for condensing the emergent light flux from the aberration compensating optical element 114, on an information recording surface 105a of the optical disk 105 within the diffraction limited. The objective lens 113 is composed of two lenses which are assembled by a holding member 113a and has at least one aspherical surface. The numerical aperture on the optical disk 105 side is 0.85. The objective lens 113 comprises a flange portion 113b having a surface extending perpendicularly to the optical axis. The objective lens 113 can be accurately attached to the optical pickup device 101 by the flange portion 113b.

A divergent light flux emitted from the semiconductor laser 102 transmits through a polarization beam splitter 106. The light flux passes through a collimate lens 107 and a quarter-wave plate 108 to become a circularly polarized parallel light flux. After the light flux transmits through the aberration compensating optical element 114, the light flux passes through a stop 109 and becomes a spot formed by the objective lens 113 on the information recording surface 105a through a transparent substrate 105b of the high density storage optical desk 105. The objective lens 113 is focused and tracked by an actuator 110 disposed therearound.

The reflected light flux modulated by a information pit on the information recording surface 105a, transmits through the objective lens 113, the aberration compensating optical element 114, the quarter-wave plate 108 and the collimate lens 107. Then, the light flux becomes a converged light flux, and is reflected by the polarization beam splitter 106. By transmitting the light flux through the cylindrical lens 111, the astigmatism is given and the light flux is converged at a photo-detector 112. Then, the information recorded on the optical disk 105 can be read by using an output signal of the photo-detector 112.

In this embodiment, because the aberration compensating optical element 114 is a plastic lens and the diffraction pattern having the form of substantially concentric circles is provided on the optical surface of the aberration compensating optical element 114 as described above, the axial chromatic aberration having an opposite sign to the axial chromatic aberration caused at the objective lens 113 and having the same absolute value as the axial chromatic aberration caused at the objective lens 113, is generated by the aberration compensating optical element 114 for the oscillation wavelength of the semiconductor laser 102. Therefore, the light flux emitted from the semiconductor laser 102 is condensed on the information recording surface 105a of the optical disk 105 without causing the axial chromatic aberration by transmitting the light flux through the aberration compensating optical element 114 and the objective lens 113.

In this embodiment, when the temperature of the objective lens 113 and that of the aberration compensating optical element 114 rise by radiating heat from a focusing coil and a tracking coil which are attached near the objective lens 113 or by raising the external temperature for the optical pickup device 101, the refractive index of the plastic lens is changed so as to decrease it. Therefore, the third-order spherical aberration component is changed in an under-corrected direction at the objective lens 113. Then, because the refractive power of the whole system of the aberration compensating optical element 114 as a refractive lens satisfies the above formula (22), the emergent light flux from the aberration compensating optical element 114 becomes a converged light flux. The third-order spherical aberration which was changed in an under-corrected direction is cancelled by entering the converged light flux into the objective lens 113. As a result, even though the temperature rises, the light flux emitted from the semiconductor laser 102 is condensed on the information recording surface 105a in a state of minimizing the spherical aberration by transmitting the light flux through the aberration compensating optical element 114 and the objective lens 113.

The optical pickup device shown in FIG. 11, can be provided in a recorder and a reproducer for at least one of a sound and an image, for example, a player or a drive which is compatible with an optical information recording medium, such as a next generation high density recording medium like a high density DVD or the like, CD, CD-R, CD-RW, CD-Video, CD-ROM, DVD, DVD-ROM, DVD-RAM, DVD-R, DVD–RW, DVD+RW, MD or the like, or an AV apparatus, a personal computer or other information terminals into which the player or the drive is incorporated, or the like.

EXAMPLES

Figure 14:
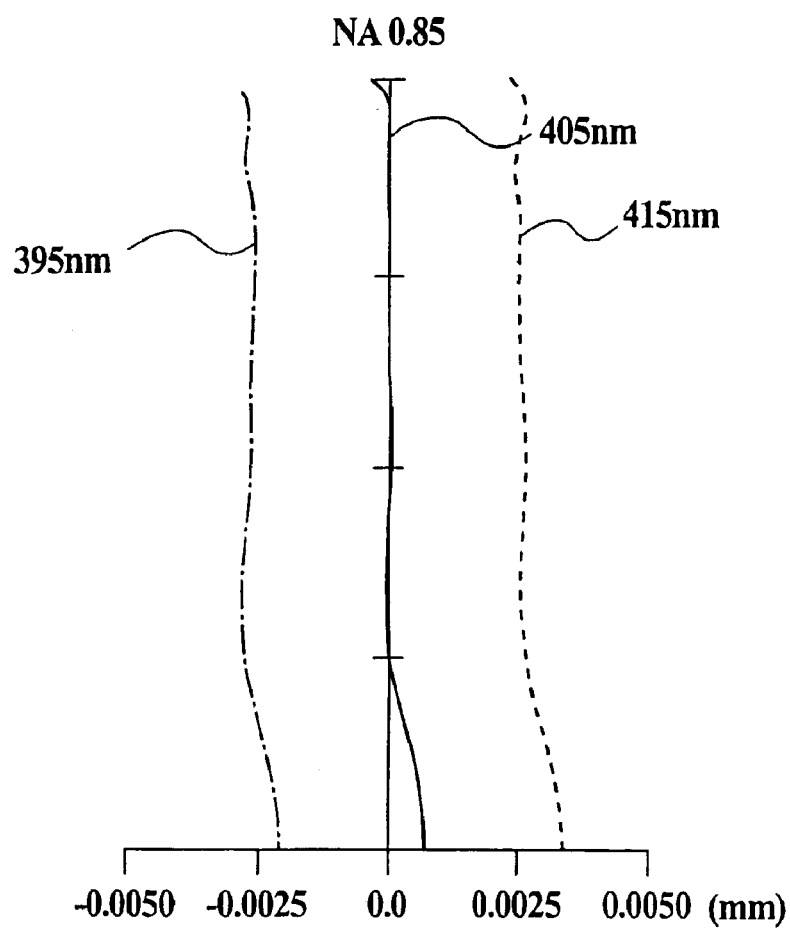
FIG. 14 is a graph showing the spherical aberration and the axial chromatic aberration of the objective lens shown in FIG. 13 at the wavelength of 405±10 nm.

In FIGS. 13 and 14, an example of the objective lens which causes the change in the spherical aberration due to the temperature change, and the axial chromatic aberration to be compensated by the aberration compensating optical element according to Examples 4 to 6 in the second embodiment of the present invention, is shown. FIG. 13 is an optical path diagram of the objective lens (focal length 1.76 mm, image-side numerical aperture 0.85) which causes the axial chromatic aberration to be compensated by the aberration compensating optical element according to the present invention. The objective lens is made of olefin resin having the Abbe constant of 56.5 at the d-line. Further, FIG. 14 is a graph showing the spherical aberration and the axial chromatic aberration of the objective lens at the wavelength of 405±10 nm. FIG. 14 shows that when the wavelength is shifted to the long wavelength side by 10 nm, the focal point is shifted to the over side about 3 μm.

Next, Examples 4 to 8 of the optical system for an optical pickup device according to the second embodiment of the present invention, will be explained. When the optical axis direction is "X-axis", the height in the direction perpendicular to the optical axis is "h", and the radius of curvature of the refractive surface is "r", they are represented by the following formula (38).

$$X = \frac{h^2/r}{1 + \sqrt{1 - (1+\kappa)h^2/r^2}} + \sum_{i=2} A_{2i} h^{2i} \quad (38)$$

where κ is the coefficient of circular cone and $A_{2i}$ is the coefficient of aspheric surface.

The diffractive surface having ring-shaped zones provided on the lens according to the present examples, can be represented by the following formula (39) when the optical path difference function is Φb.

$$\Phi_b = n \sum_{j=1} b_{2j} h^{2j} \quad (39)$$

where n is the diffraction order of the diffracted light having the maximum diffracted light amount among the diffracted lights generated by the diffractive surface, h is the height perpendicular to the optical axis, and $b_{2j}$ is the coefficient of the optical path difference function.

Example 4

Figure 15:
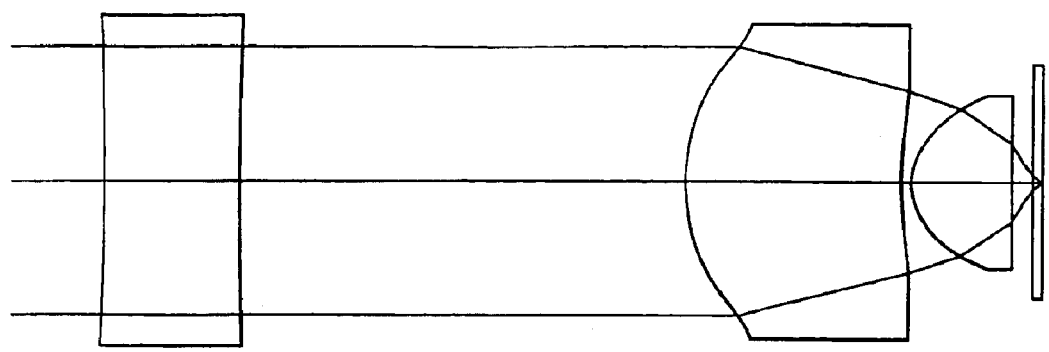
FIG. 15 is an optical path diagram of the optical system for the optical pickup device according to Example 4.

In Table 5, the data relating to the optical system for the optical pickup device according to Example 4, are shown. In FIG. 15, the optical path diagram of the optical system for the optical pickup device according to Example 4, is shown.

TABLE 5

| Surface No. | r (mm) | d (mm) | $N_\lambda$ | $v_d$ | Note |
|---|---|---|---|---|---|
| 0 |  | ∞ |  |  | Light source |
| 1 | −27.620 | 1.500 | 1.52491 | 56.5 | Aberration compensating optical element |
| 2 | 28.168 | 5.000 |  |  |  |
| 3 | 2.074 | 2.400 | 1.52491 | 56.5 | Objective lens |
| 4 | 8.053 | 0.100 |  |  |  |
| 5 | 0.863 | 1.100 | 1.52491 | 56.5 |  |
| 6 | ∞ | 0.240 |  |  |  |
| 7 | ∞ | 0.100 | 1.61949 | 30.0 | Transparent substrate |
| 8 | ∞ |  |  |  |  |

Coefficients of aspherical surface

|  | First surface | Second surface | Third surface | Fourth surface | Fifth surface |
|---|---|---|---|---|---|
| κ | −5.4091E+00 | 1.2966E+00 | −1.2955E−01 | 4.7554E+01 | −7.1425E−01 |
| $A_4$ | −1.1312E−05 | −4.2412E−07 | −3.7832E−03 | 1.3641E−02 | 1.3647E−01 |
| $A_6$ |  |  | 5.1667E−04 | −2.9201E−02 | −5.3414E−02 |
| $A_8$ |  |  | −1.1780E−03 | −9.3339E−03 | 3.0269E−01 |
| $A_{10}$ |  |  | −2.0628E−04 | 3.3011E−02 | −1.6898E−01 |
| $A_{12}$ |  |  | 2.5941E−05 | −2.2626E−02 |  |
| $A_{14}$ |  |  | 1.4917E−04 |  |  |
| $A_{16}$ |  |  | −5.1578E−05 |  |  |

Coefficients of diffractive surface

|  | First surface | Second surface |
|---|---|---|
| $b_2$ | −4.7281E−03 | −4.6816E−03 |

In Example 4, by making the aberration compensating optical element of olefin resin and forming the diffractive surfaces on the both optical surfaces which are on the light source side and the objective lens side, the axial chromatic aberration caused at the objective lens was compensated. Further, the total power of each optical surface was 0 by forming each optical surface so as to have the negative refractive power and the diffractive power having the same absolute value as the refractive power. Therefore, the emergent light flux diameter was not changed in comparison with the incident light flux diameter. Further, the coefficient of the optical path difference function shown in Table 5, was determined so that the second-order diffracted light had a maximum diffracted light amount.

Figure 16:
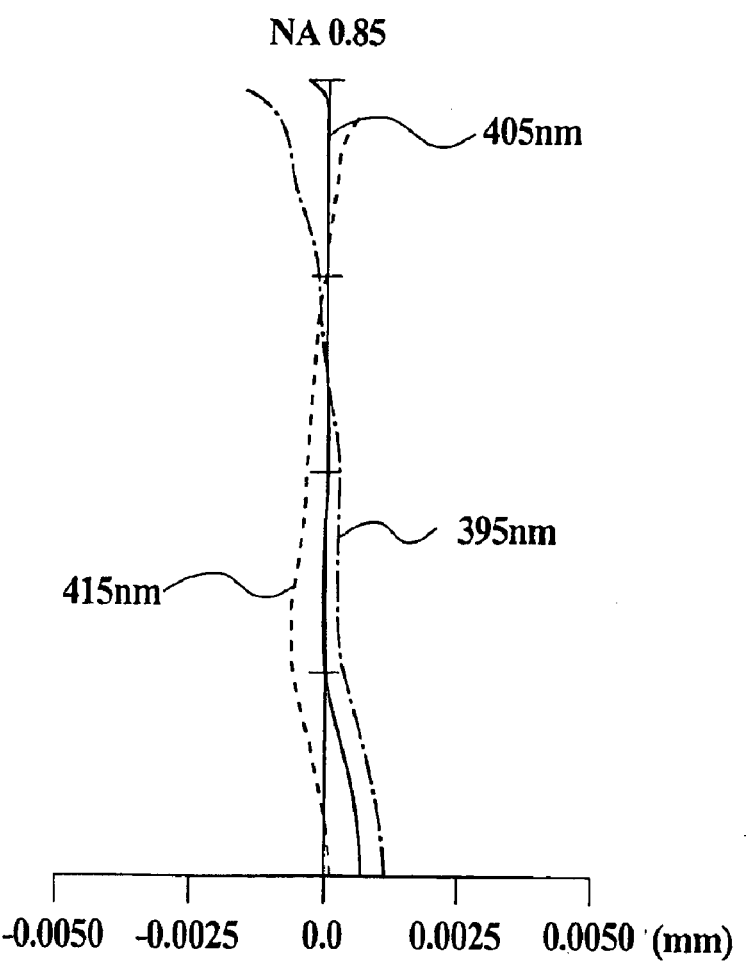
FIG. 16 is a graph showing the spherical aberration and the axial chromatic aberration of the optical system for the optical pickup device according to Example 4 at the wavelength of 405±10 nm.

FIG. 16 is a graph showing the spherical aberration and the axial chromatic aberration of the optical system for the optical pickup device according to Example 4 at the wavelength of 405±10 nm. FIG. 6 shows that the focal point is hardly shifted regardless of the wavelength.

The diffractive power of the aberration compensating optical element was determined so that the axial chromatic aberration caused in the compound system including the objective lens was over-corrected. Further, the aberration remained in the lens so that the spherical aberration caused in the compound system was over-corrected on the long wavelength side and was under-corrected on the short wavelength side. The shift of the best image point, which was caused by changing the wavelength, was minimized by crossing the graph of the spherical aberration of the reference wavelength and ones of the spherical aberrations on the long wavelength side and the short wavelength side. Therefore, the defocus component of the wavefront aberration, which was caused by the mode hopping of +1 nm, could be decreased to $0.002\lambda$rms (calculated value).

In case that the chromatic aberration caused in the compound system is compensated as described above, the interval of the diffracting ring-shaped zone on the aberration compensating optical element can be expanded in comparison with the case that the shift of the best image point, which is caused by changing the wavelength, is minimized by almost perfectly compensating the axial chromatic aberration of the compound system and by almost perfectly compensating the spherical aberration on the long wavelength side and the spherical aberration on the short wavelength side. Therefore, the light amount loss caused by the form error of the diffracting ring-shaped zone structure in the manufacture thereof can be minimized.

Example 5

Figure 17:
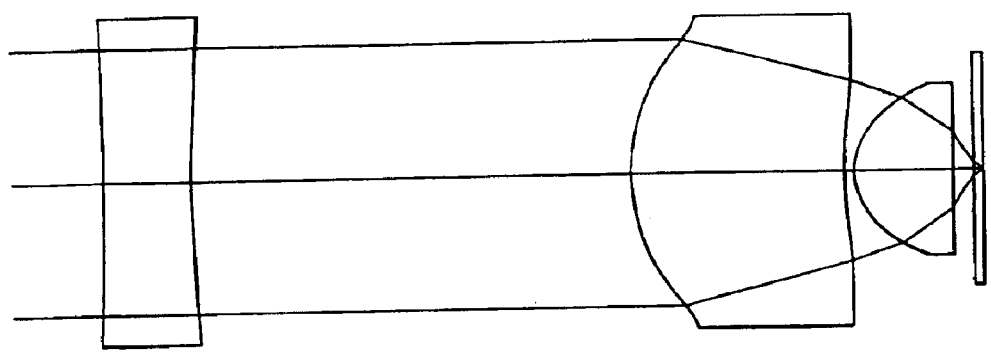
FIG. 17 is an optical path diagram of the optical system for the optical pickup device according to Example 5.

In Table 6, the data relating to the optical system for the optical pickup device according to Example 5, are shown. In FIG. 17, the optical path diagram of the optical system for the optical pickup device according to Example 5, is shown.

TABLE 6

| Surface No. | r (mm) | d (mm) | $N_\lambda$ | $v_d$ | Note |
|---|---|---|---|---|---|
| 0 | | ∞ | | | Light source |
| 1 | ∞ | 1.000 | 1.52491 | 56.5 | Aberration compensating optical element |
| 2 | 14.165 | 5.000 | | | |
| 3 | 2.074 | 2.400 | 1.52491 | 56.5 | Objective lens |
| 4 | 8.053 | 0.100 | | | |
| 5 | 0.863 | 1.100 | 1.52491 | 56.5 | |

TABLE 6-continued

| Surface No. | r (mm) | d (mm) | $N_\lambda$ | $v_d$ | Note |
|---|---|---|---|---|---|
| 6 | ∞ | 0.240 | | | |
| 7 | ∞ | 0.100 | 1.61949 | 30.0 | Transparent substrate |
| 8 | ∞ | | | | |

| Coefficients of aspherical surface | | | | |
|---|---|---|---|---|
| | Second surface | Third surface | Fourth surface | Fifth surface |
| κ | −1.0003E+00 | −1.2955E−01 | 4.7554E+01 | −7.1425E−01 |
| $A_4$ | −1.0589E−04 | −3.7832E−03 | 1.3641E−02 | 1.3647E−01 |
| $A_6$ | | 5.1667E−04 | −2.9201E−02 | −5.3414E−02 |
| $A_8$ | | −1.1780E−03 | −9.3339E−03 | 3.0269E−01 |
| $A_{10}$ | | −2.0628E−04 | 3.3011E−02 | −1.6898E−01 |
| $A_{12}$ | | 2.5941E−05 | −2.2626E−02 | |
| $A_{14}$ | | 1.4917E−04 | | |
| $A_{16}$ | | −5.1578E−05 | | |

| Coefficients of diffractive surface | |
|---|---|
| | First surface |
| $b_2$ | −9.0435E−03 |
| $b_4$ | 3.1856E−05 |

In Example 5, by making the aberration compensating optical element of olefin resin and forming a diffractive surface which is a macroscopically plane surface, on the optical surface of the light source side, that is, preparing the diffractive structure on the optical surface of the light source side so that the diffractive structure comprises a plurality of ring-shaped zone steps having the form of the substantially concentric circles which are formed on a plane surface, the axial chromatic aberration caused at the objective lens was compensated. Further, the power of the whole system in the aberration compensating optical element was 0 by forming the optical surface of the objective lens side so as to have the negative refractive power and by forming the optical surface of the light source side so as to have the diffractive power having the same absolute value as the refractive power. Further, the coefficient of the optical path difference function shown in Table 2, was determined so that the second-order diffracted light had a maximum diffracted light amount.

Figure 18:
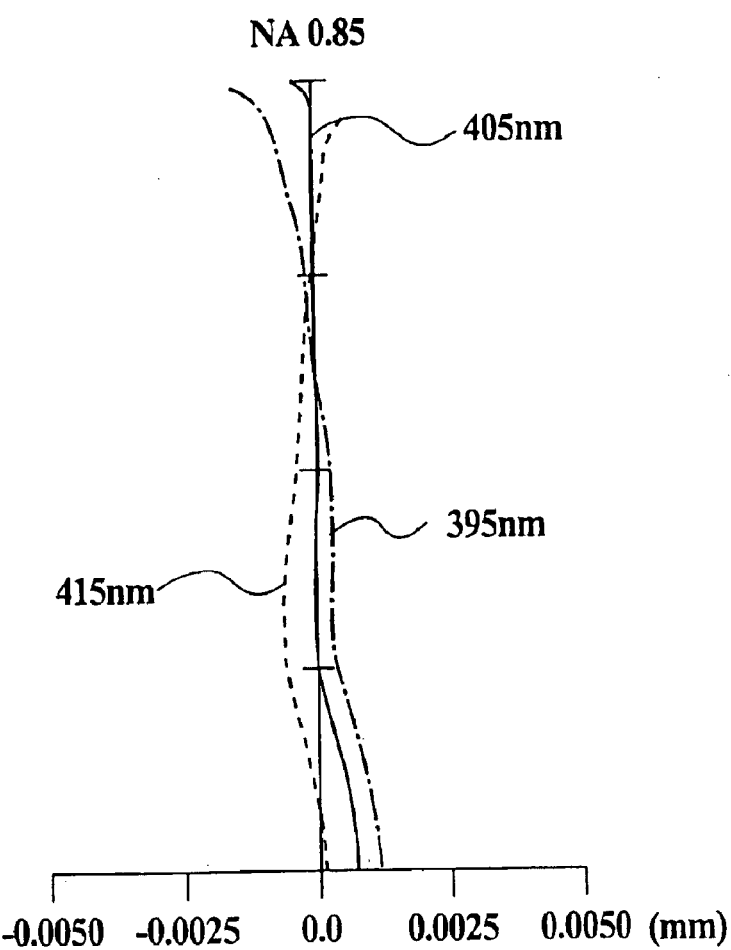
FIG. 18 is a graph showing the spherical aberration and the axial chromatic aberration of the optical system for the optical pickup device according to Example 5 at the wavelength of 405±10 nm.

FIG. 18 is a graph showing the spherical aberration and the axial chromatic aberration of the optical system for the optical pickup device according to Example 5 at the wavelength of 405±10 nm. FIG. 18 shows that the focal point is hardly shifted regardless of the wavelength.

Example 6

Figure 19:
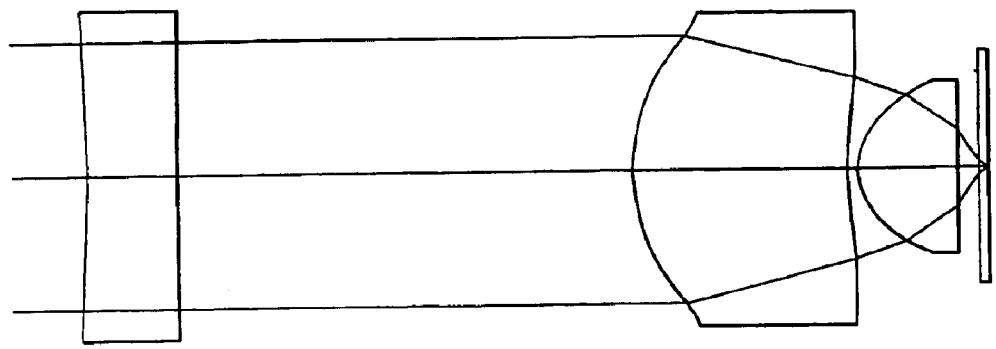
FIG. 19 is an optical path diagram of the optical system for the optical pickup device according to Example 6.

In Table 7, the data relating to the optical system for the optical pickup device according to Example 6, are shown. In FIG. 19, the optical path diagram of the optical system for the optical pickup device according to Example 6, is shown.

TABLE 7

| Surface No. | r (mm) | d (mm) | $N_\lambda$ | $v_d$ | Note |
|---|---|---|---|---|---|
| 0 | | ∞ | | | Light source |
| 1 | −17.495 | 1.000 | 1.52491 | 56.5 | Aberration compensating optical element |
| 2 | ∞ | 5.000 | | | |
| 3 | 2.074 | 2.400 | 1.52491 | 56.5 | Objective lens |
| 4 | 8.053 | 0.100 | | | |
| 5 | 0.863 | 1.100 | 1.52491 | 56.5 | |

TABLE 7-continued

| 6 | ∞ | 0.240 | | | |
| 7 | ∞ | 0.100 | 1.61949 | 30.0 | Transparent |
| 8 | ∞ | | | | substrate |

| Coefficients of aspherical surface | | | | |
| --- | --- | --- | --- | --- |
| | First surface | Third surface | Fourth surface | Fifth surface |
| κ | 2.7605E+01 | −1.2955E−01 | 4.7554E+01 | −7.1425E−01 |
| $A_4$ | 1.9423E−03 | −3.7832E−03 | 1.3641E−02 | 1.3647E−01 |
| $A_6$ | −1.4942E−03 | 5.1667E−04 | −2.9201E−02 | −5.3414E−02 |
| $A_8$ | | −1.1780E−03 | −9.3339E−03 | 3.0269E−01 |
| $A_{10}$ | | −2.0628E−04 | 3.3011E−02 | −1.6898E−01 |
| $A_{12}$ | | 2.5941E−05 | −2.2626E−02 | |
| $A_{14}$ | | 1.4917E−04 | | |
| $A_{16}$ | | −5.1578E−05 | | |

| Coefficients of diffractive surface | |
| --- | --- |
| | First surface |
| $b_2$ | −7.5000E−03 |
| $b_4$ | 3.3173E−04 |
| $b_6$ | −4.0384E−04 |
| $b_8$ | 3.8224E−06 |
| $b_{10}$ | −1.0509E−06 |

In Example 6, by making the aberration compensating optical element of olefin resin and forming the diffractive surfaces on the optical surfaces of the light source side, the axial chromatic aberration caused at the objective lens was compensated. Further, the power of the whole system in the aberration compensating optical element was 0 by forming the optical surface of the light source side so as to have the negative refractive power and the diffractive power having the same absolute value as the refractive power, and by forming the optical surface of the light source side so as to be a plane surface. Further, the coefficient of the optical path difference function shown in Table 7, was determined so that the second-order diffracted light had a maximum diffracted light amount. In this example, the terms of the optical path difference function, to which the second or higher order coefficients were given, were used. The diffractive surface had a spherical aberration property to shift the spherical aberration in an under-corrected direction when the wavelength was shifted to the long wavelength side. Then, the change in the spherical aberration, which was caused at the objective lens when the wavelength was shifted to the long wavelength side, was cancelled by the spherical aberration of the diffractive surface.

Figure 20:
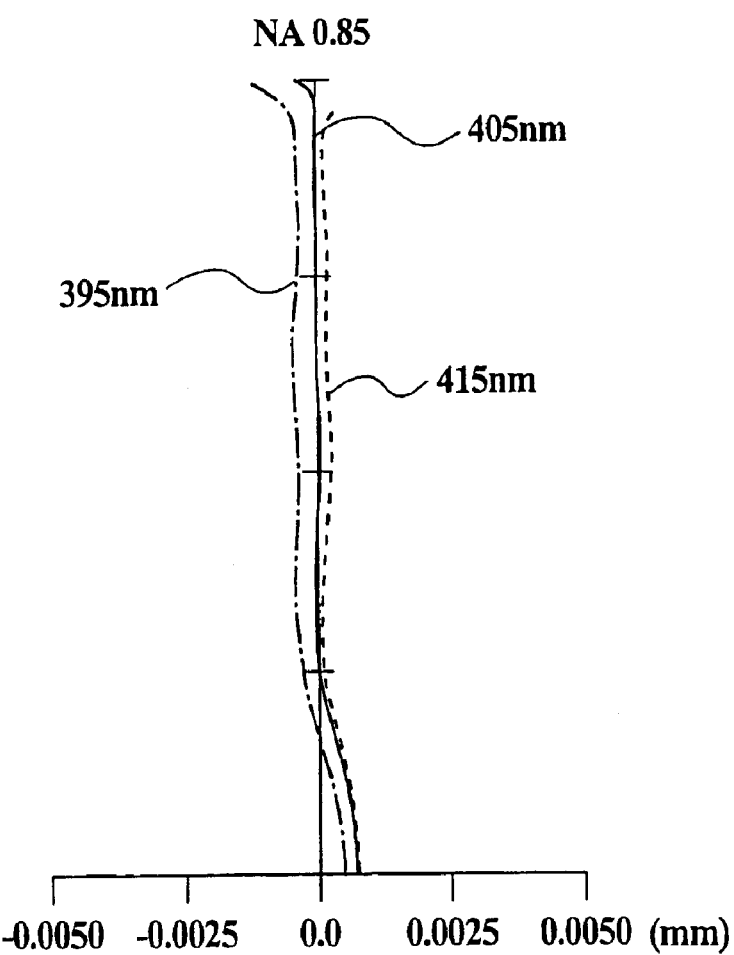
FIG. 20 is a graph showing the spherical aberration and the axial chromatic aberration of the optical system for the optical pickup device according to Example 6 at the wavelength of 405±10 nm.

FIG. 20 is a graph showing the spherical aberration and the axial chromatic aberration of the optical system for the optical pickup device according to Example 6 at the wavelength of 405±10 nm. FIG. 20 shows that the focal point is hardly shifted regardless of the wavelength.

Example 7

Figure 21:
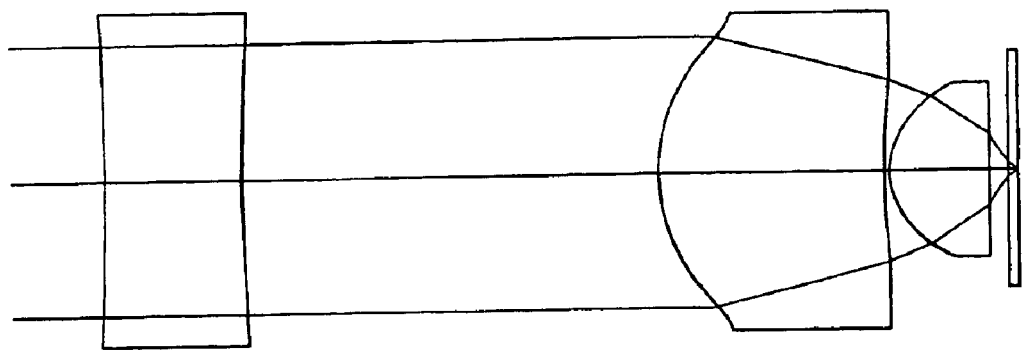
FIG. 21 is an optical path diagram of the optical system according to Example 7.
Figure 22:
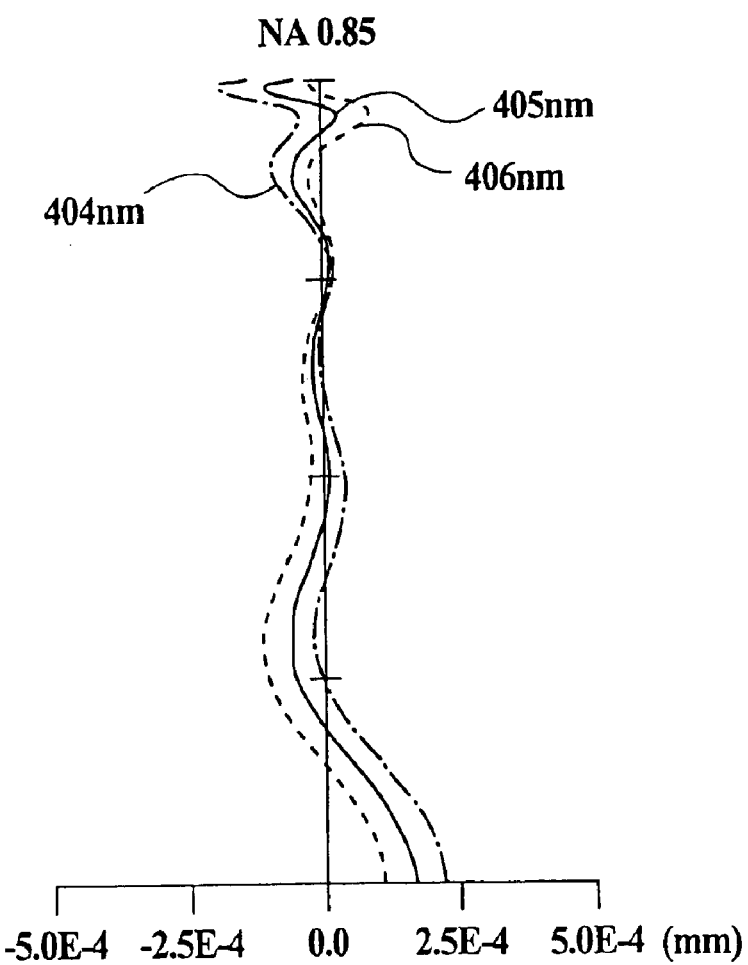
FIG. 22 is a graph showing the spherical aberration and the axial chromatic aberration of the optical system according to Example 7 at the wavelength of 405±10 nm.

In Table 8, the data relating to the optical system according to Example 7, are shown. In FIG. 21, the optical path diagram thereof is shown. FIG. 22 shows the spherical aberration and the axial chromatic aberration of the optical system according to Example 7 at the wavelength of 405±1 nm.

TABLE 8

| Surface No. | r (mm) | d (mm) | $N_{404}$ | $N_{405}$ | $N_{406}$ | Note |
| --- | --- | --- | --- | --- | --- | --- |
| 0 | | ∞ | | | | Light source |
| 1 | −27.620 | 1.500 | 1.52506 | 1.52491 | 1.52476 | Aberration compensating optical element |
| 2 | 28.168 | 5.000 | | | | |
| 3 | 1.959 | 2.450 | 1.52485 | 1.52469 | 1.52454 | Objective lens |
| 4 | 10.207 | 0.050 | | | | |
| 5 | 0.892 | 1.100 | 1.52485 | 1.52469 | 1.52454 | |
| 6 | ∞ | 0.201 | | | | |
| 7 | ∞ | 0.100 | 1.61990 | 1.61950 | 1.61909 | Transparent substrate |
| 8 | ∞ | | | | | |

| Coefficients of aspherical surface | | | | | |
| --- | --- | --- | --- | --- | --- |
| | First surface | Second surface | Third surface | Fourth surface | Fifth surface |
| κ | −5.4091E+00 | 1.2966E+00 | −1.6847E−01 | 8.3955E+01 | −7.4973E−01 |
| $A_4$ | −1.1312E−05 | −4.2412E−07 | −4.8527E−03 | 5.4087E−03 | 1.2350E−01 |
| $A_6$ | | | −3.6816E−04 | −6.1028E−03 | 1.6589E−02 |
| $A_8$ | | | −3.6905E−04 | −1.4958E−02 | 1.8042E−01 |
| $A_{10}$ | | | −2.1477E−04 | 1.9993E−02 | −1.0532E−01 |
| $A_{12}$ | | | −6.5049E−05 | −1.7848E−02 | |
| $A_{14}$ | | | 1.3300E−04 | | |
| $A_{16}$ | | | −4.2576E−05 | | |

| Coefficients of diffractive surface | |
| --- | --- |
| | First surface | Second surface |
| $b_2$ | −4.7281E−03 | −4.6816E−03 |

In this example, the aberration compensating optical element which is a plastic lens, is provided on the light source side of the plastic objective lens shown in Table 4. The aberration compensating optical element according to this example is the same as one according to Example 4.

Example 8

Figure 23:
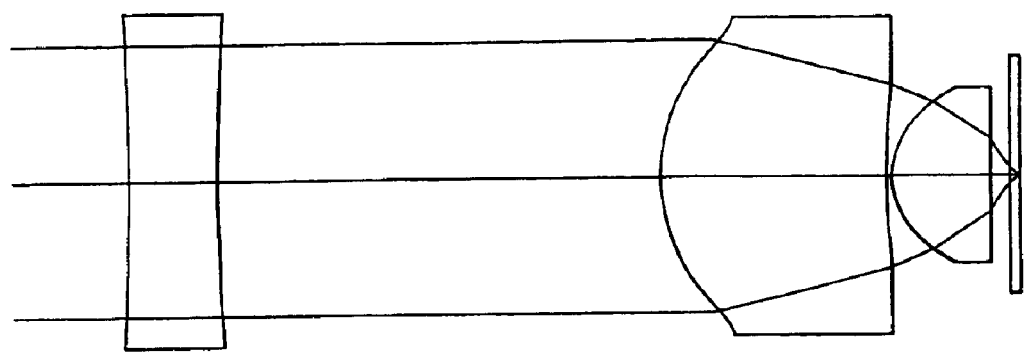
FIG. 23 is an optical path diagram of the optical system according to Example 8.
Figure 24:
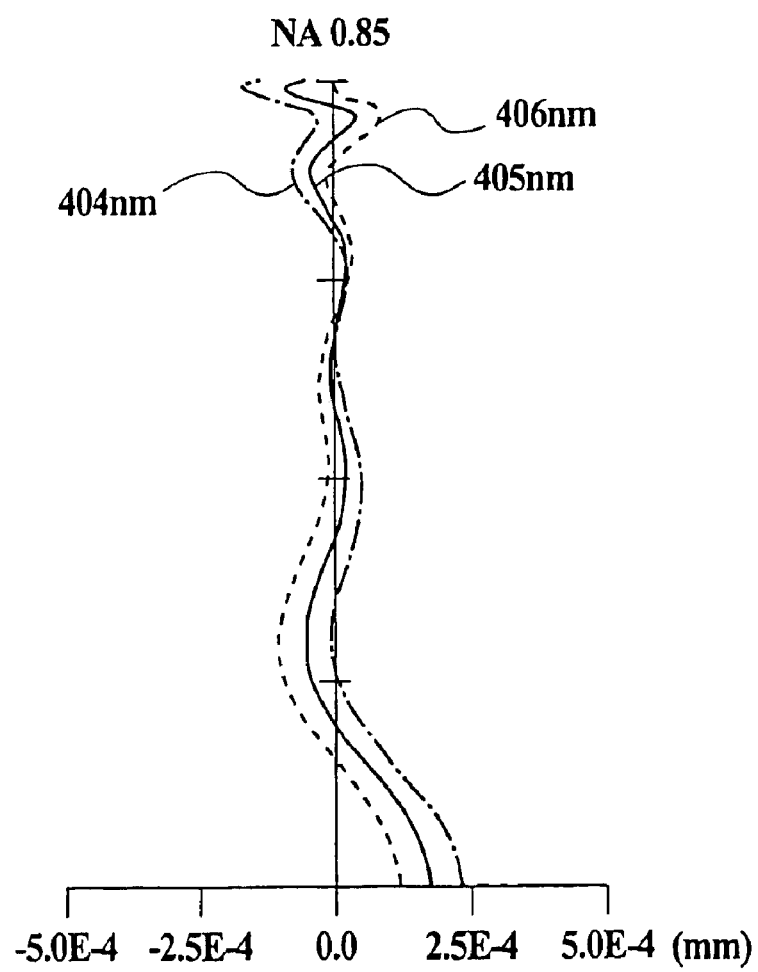
FIG. 24 is a graph showing the spherical aberration and the axial chromatic aberration of the optical system according to Example 8 at the wavelength of 405±1 nm.

In Table 9, the data relating to the optical system according to Example 8, are shown. In FIG. 23, the optical path diagram thereof is shown. FIG. 24 shows the spherical aberration and the axial chromatic aberration of the optical system according to Example 8 at the wavelength of 405±1 nm.

TABLE 9

| Surface No. | r (mm) | d (mm) | $N_{404}$ | $N_{405}$ | $N_{406}$ | Note |
|---|---|---|---|---|---|---|
| 0 | | ∞ | | | | Light source |
| 1 | ∞ | 1.000 | 1.52506 | 1.52491 | 1.52476 | Aberration compensating optical element |
| 2 | 14.165 | 5.000 | | | | |
| 3 | 1.959 | 2.450 | 1.52485 | 1.52469 | 1.52454 | Objective lens |
| 4 | 10.207 | 0.050 | | | | |
| 5 | 0.892 | 1.100 | 1.52485 | 1.52469 | 1.52454 | |
| 6 | ∞ | 0.201 | | | | |
| 7 | ∞ | 0.100 | 1.61990 | 1.61950 | 1.61909 | Transparent substrate |
| 8 | ∞ | | | | | |

Coefficients of aspherical surface

| | Second surface | Third surface | Fourth surface | Fifth surface |
|---|---|---|---|---|
| κ | −1.0003E+00 | −1.6847E−01 | 8.3955E+01 | −7.4973E−01 |
| $A_4$ | −1.0589E−04 | −4.8527E−03 | 5.4087E−03 | 1.2350E−01 |
| $A_6$ | | −3.6816E−04 | −6.1028E−03 | 1.6589E−02 |
| $A_8$ | | −3.6905E−04 | −1.4958E−02 | 1.8042E−02 |
| $A_{10}$ | | −2.1477E−04 | 1.9993E−02 | −1.0532E−01 |
| $A_{12}$ | | −6.5049E−05 | −1.7848E−02 | |
| $A_{14}$ | | 1.3300E−04 | | |
| $A_{16}$ | | −4.2576E−05 | | |

Coefficients of diffractive surface

| | First surface |
|---|---|
| $b_2$ | −9.0435E−03 |
| $b_4$ | 3.1856E−05 |

In this example, the aberration compensating optical element which is a plastic lens, is provided on the light source side of the plastic objective lens shown in Table 4. The aberration compensating optical element according to this example is the same as one according to Example 5.

In the lens data shown in Tables 5, 6 and 7, r (mm) is the radius of curvature, d (mm) is the surface interval, $N_\lambda$ is the refractive index at the wavelength of 405 nm, and $v_d$ is the Abbe constant. The design reference wavelength of the aberration compensating optical element according to Examples 4 to 6 and that of the objective lens according to Examples 4 to 6 are 405 nm. Each design reference temperature thereof is 25° C.

In the lens data shown in Tables 4, 8 and 9, r (mm) is the radius of curvature, d (mm) is the surface interval and $N_{404}$, $N_{405}$ and $N_{406}$ are the refractive indexes at the wavelength of 404 nm, 405 nm and 406 nm, respectively. The design reference wavelength of the aberration compensating optical element according to Examples 7 and 8 and that of the objective lens according to Examples 7 and 8 are 405 nm. Each design reference temperature thereof is 25° C.

In the aberration compensating optical element according to Examples 4 to 8, the diffractive power (the sign thereof is positive) as a diffractive lens function and the refractive power (the sign thereof is negative) as a refraction lens function have different sings from each other and the same absolute values. Therefore, the paraxial power of the whole system of the aberration compensating optical element is 0 in the design reference wavelength of 405 nm. Because the refractive power of the aberration compensating optical element is negative, the converged light flux is emerged from the aberration compensating optical element when the temperature rises. Thereby, the third-order spherical aberration changed in an under-corrected direction at the objective lens when the temperature rises, is cancelled.

Figure 25:
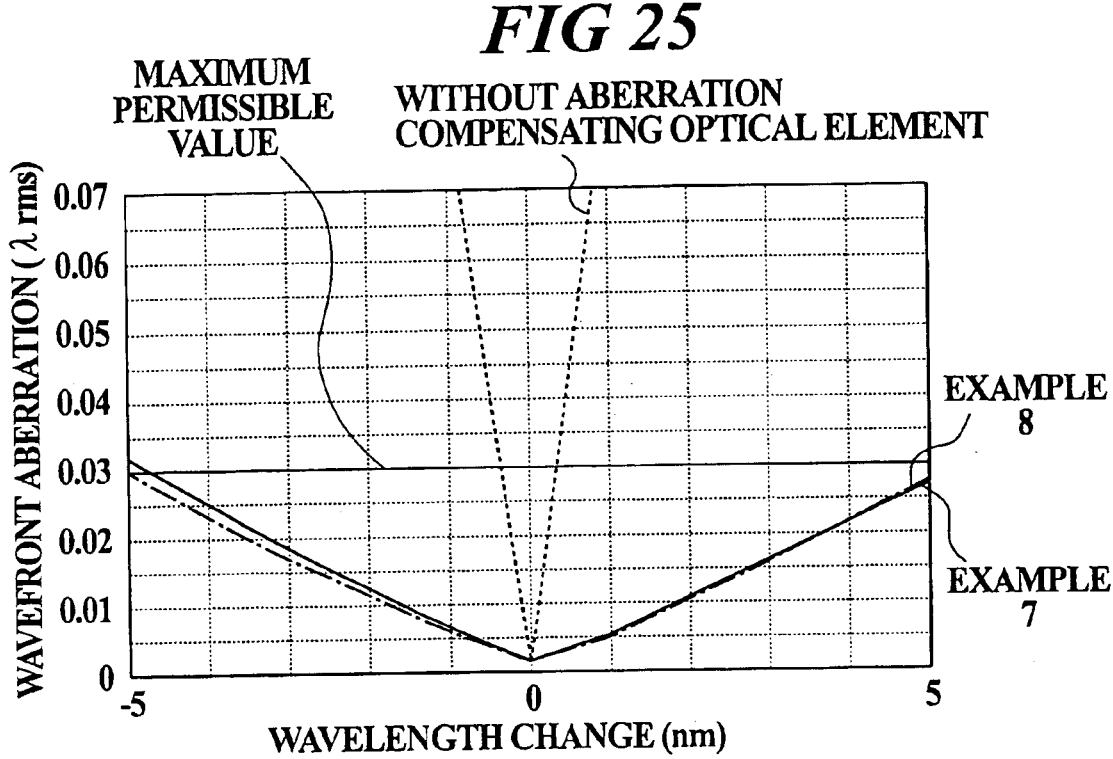
FIG. 25 is a view showing the result that the axial chromatic aberration caused at the objective lens shown in Table 4 due to the instant wavelength change of the light emitted from the light source is compensated by the aberration compensating optical elements according to Examples 7 and 8.

FIG. 25 shows the result that the axial chromatic aberration caused at the objective lens shown in Table 4 due to the instant wavelength change of the light emitted from the light source is compensated by the aberration compensating optical elements according to Examples 7 and 8. When the wavelength change of ±1 nm corresponding to the wavelength change caused by the mode hopping of the blue-violet semiconductor leaser, occurs, the RMS value of the wavefront aberration becomes not less than 0.03λms in case of the objective lens only ("without aberration compensating optical element" shown in FIG. 25). However, by using the aberration compensating optical element with the objective lens, in both cases of Examples 7 and 8, with respect to the wavelength change of ±1 nm, the RMS value of the wavefront aberration becomes not more than 0.03λms.

In FIG. 25, the wavelength change 0 corresponds to the design reference wavelength of 405 nm. When the RMS value of the wavefront aberration is calculated, the objective lens is fixed to the best focus position for the wavelength of 405 nm.

Figure 26:
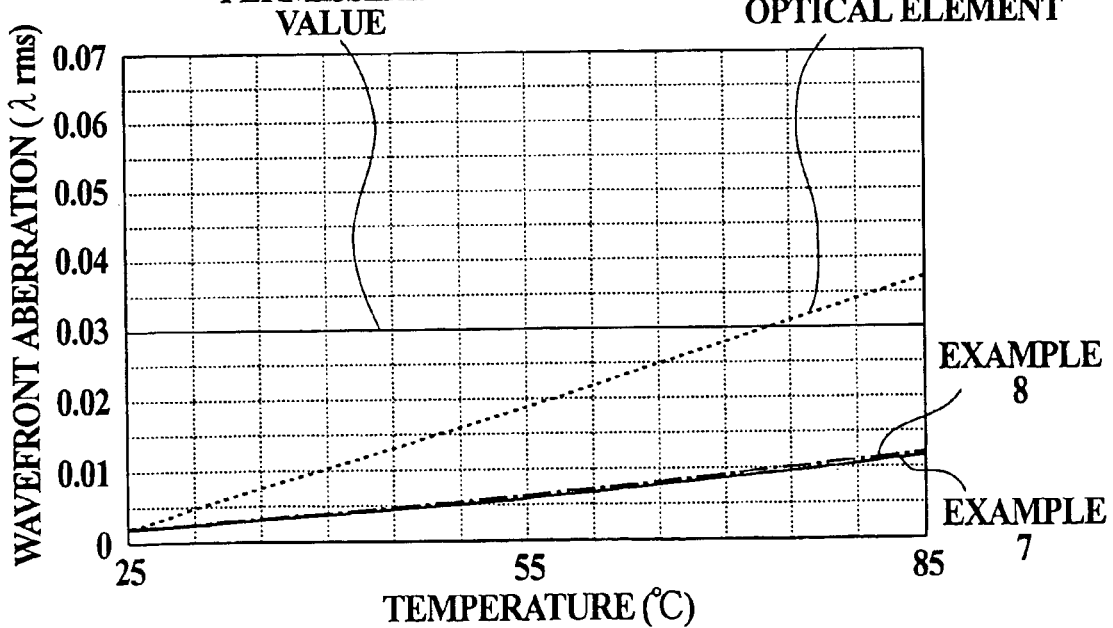
FIG. 26 is a view showing the result that the third-order spherical aberration changed at the objective lens shown in Table 4 is compensated by the aberration compensating optical elements according to Examples 7 and 8.

FIG. 26 shows the result that the third-order spherical aberration changed by the temperature change at the objective lens shown in Table 4 is compensated by the aberration compensating optical elements according to Examples 7 and 8. At the temperature of 85° C. which is an operation guarantee temperature of an optical disk player, the RMS value of the wavefront aberration becomes not less than 0.03λms (maximum permissible value of the wavefront aberration) in case of the objective lens only ("without aberration compensating optical element" shown in FIG. 26). However, by using the aberration compensating optical element with the objective lens, in both cases of Examples 7 and 8, the RMS value of the wavefront aberration becomes not more than 0.03λms.

In FIG. 26, when the RMS value of the wavefront aberration is calculated, only the change in the refractive index of the plastic lens, which is caused by the environment temperature, is considered. An amount of the change therein is about $-1.0 \times 10^{-4}/°$ C.

In the above tables or the drawings, there are some cases that the power exponent of 10 is expressed by using "E" (or "e"), such as E-02 (=$10^{-2}$).

According to the present invention, it is possible to provide an aberration compensating optical element which can compensate the spherical aberration and the sine condition because of a large numerical aperture on the optical information recording medium side, and can compensate the axial chromatic aberration when an objective lens in which the axial chromatic aberration remains, is used in order to down size an optical device, to thin it, to lighten it, and to decrease the cost thereof.

Further, it is possible to provide an optical system for optical pickup device, which can compensate the axial chromatic aberration with a relatively simple structure even though a light source having a bad monochromaticity or a light source in which a wavelength of the light suddenly changes, is used in a high density storage optical pickup system or the like, and which can be manufactured in a low cost; an optical pickup device comprising the above optical system; and a recorder and a reproducer, comprising the above optical pickup device.

According to the present invention, it is possible to provide an optical system used in optical pickup device, for suppressing the change in the spherical aberration, which is caused at an objective lens by the temperature change, with a relatively simple structure, even though a high NA plastic objective lens is used in a high density storage optical pickup system or the like; an optical pickup device comprising the above optical system; and a recorder and a reproducer, comprising the above optical pickup device.

Further, it is possible to provide an aberration compensating optical element which can compensate the change in the spherical aberration, which is caused at an objective lens by the temperature change, when a plastic objective lens in which the change of the spherical aberration is large because of the temperature change, is used.

Further, it is possible to provide an optical system for optical pickup device, which can compensate the axial chromatic aberration with a relatively simple structure even though a light source having a bad monochromaticity or a light source in which a wavelength of the light suddenly changes, is used in a high density storage optical pickup system or the like, and which can be manufactured in a low cost; an optical pickup device comprising the above optical system; and a recorder and a reproducer, comprising the above optical pickup device.

Further, it is possible to provide an aberration compensating optical element which can compensate the spherical aberration and the sine condition because of a large numerical aperture on the optical information recording medium side, and can compensate the axial chromatic aberration when an objective lens in which the axial chromatic aberration remains, is used in order to downsize an optical device, to thin it, to lighten it, and to decrease the cost thereof.

The entire disclosure of Japanese Patent Applications No. Tokugan 2001-210659 filed on Jul. 11, 2001, No. Tokugan 2001-284407 filed on Sep. 19, 2001 and No. Tokugan 2002-53085 filed on Feb. 28, 2002 including specification, claims drawings and summary are incorporated herein by reference in its entirety.

What is claimed is:

1. An aberration compensating optical element comprising:
a single lens, comprising:
a first optical surface comprising a diffractive structure comprising a plurality of ring-shaped zone steps formed on a plane surface; and
a second optical surface opposite to the first optical surface, the second optical surface comprising a concave refractive surface;
wherein the single lens satisfies the following relation:

$P_{\lambda 1} < P_{\lambda 0} < P_{\lambda 2}$ wherein $P_{\lambda 0}$ represents a paraxial power (mm$^{-1}$) of the single lens at a wavelength $\lambda_0$ of a light flux, which passes through the single lens; $P_{\lambda 1}$ represents a paraxial power (mm$^{-1}$) of the single lens at a wavelength $\lambda_1$, which is 10 nm shorter than the wavelength $\lambda_0$; and $P_{\lambda 2}$ represents a paraxial power (mm$^{-1}$) of the single lens at a wavelength $\lambda_2$, which is 10 nm longer than the wavelength $\lambda_0$.

2. An aberration compensating optical element comprising:
a single lens, comprising:
a first optical surface comprising a diffractive structure comprising a plurality of ring-shaped zone steps formed on a plane surface; and
a second optical surface opposite to the first optical surface, the second optical surface comprising a concave refractive surface;
wherein at least one ring-shaped zone step having a step distance Δ (mm) in a direction of an optical axis between adjacent steps of the plurality of ring-shaped zone steps is formed within an effective diameter so that m, defined by the following equations, becomes an integer except 0 and ±1:

$m = INT(Y)$, $Y = \Delta \times (n-1)/(\lambda_0 \times 10^{-3})$, wherein INT(Y) is an integer obtained by rounding Y; $\lambda_0$ is the wavelength (nm) of a light flux, which passes through the single lens; and n is a refractive index of the single lens at the wave length $\lambda_0$ (nm).

3. An aberration compensating optical element comprising:
a single lens, comprising:
a first optical surface comprising a diffractive structure comprising a plurality of ring-shaped zone steps formed on a plane surface; and
a second optical surface opposite to the first optical surface, the second optical surface comprising a concave refractive surface;
wherein the single lens satisfies the following relation:

$0.5 \times 10^{-2} < P_D < 15.0 \times 10^{-2}$, wherein $P_D$ is a paraxial power (mm$^{-1}$) of the diffractive structure and is defined by the following equation:

$P_D = \Sigma(-2 \cdot b_2 \cdot n)$, when an optical path difference Φb, which is added to a wavefront transmitting through the single lens by the diffractive structure formed on the first optical surface of the single lens, is defined by the following wavefront transmitting function:

$\Phi b = n \cdot (b_2 \cdot h^2 + b_4 \cdot h^4 + b_6 \cdot h^6 + \ldots )$, wherein h (mm) is a height from the optical axis; each of b2, b4, b6 ... is a second, fourth, sixth order coefficient of the optical path difference function, respectively; and n is a diffraction order of a diffracted light having a maximum diffracted light amount among a plurality of diffracted lights generated by the diffractive structure formed on the first optical surface of the single lens.

4. The aberration compensating optical element of claim 3, wherein the single lens satisfies the following relation:

$1.0 \times 10^{-2} < P_D < 10.0 \times 10^{-2}$.

5. An aberration compensating optical element comprising:
a single lens, comprising:
a first optical surface comprising a diffractive structure comprising a plurality of ring-shaped zone steps formed on a plane surface; and a second optical surface opposite to the first optical surface, the second optical surface comprising a concave refractive surface, and wherein the single lens satisfies the following relations:

$P_D > 0$, $P_R < 0$, and $-0.9 < P_D/P_R < -1.1$, wherein $P_D$ is a paraxial power (mm$^{-1}$) of the diffractive structure and is defined by the following equation:

$P_D = \Sigma(-2 \cdot b_2 \cdot n)$, when an optical path difference $\Phi b$, which is added to a wavefront transmitting through the single lens by the diffractive structure formed on the first optical surface of the single lens, is defined by the following wavefront transmitting function, $\Phi b = n \cdot (b_2 \cdot h^2 + b_4 \cdot h^4 + b_6 \cdot h^6 + \ldots)$, wherein h (mm) is a height from the optical axis; each of $b_2, b_4, b_6 \ldots$ is a second, forth, sixth order coefficient of the optical path difference function, respectively; and n is a diffraction order of a diffracted light having a maximum diffracted light amount among a plurality of diffracted lights generated by the diffractive structure formed on the first optical surface of the single lens, and $P_R$ is a refractive power (mm$^{-1}$) of the single lens as a refractive lens.

6. An aberration compensating optical element comprising:

a single lens, comprising:
a first optical surface comprising a diffractive structure comprising a plurality of ring-shaped zone steps formed on a plane surface; and
a second optical surface opposite to the first optical surface, the second optical surface comprising a concave refractive surface, and wherein a paraxial power $P_{\lambda 0}$ (mm$^{-1}$) of the single lens is substantially zero at the wavelength $\lambda_0$ of a light flux, which passes through the single lens.

7. An aberration compensating optical element comprising:

a single lens, comprising:
a first optical surface comprising a diffractive structure comprising a plurality of ring-shaped zone steps formed on a plane surface; and
a second optical surface opposite to the first optical surface, the second optical surface comprising a concave refractive surface;

wherein when a wavelength of a light flux entering the diffractive structure is not more than 550 nm, a diffraction efficiency of the diffractive structure becomes maximal.

8. An aberration compensating optical element comprising:

a single lens, comprising:
a first optical surface comprising a diffractive structure comprising a plurality of ring-shaped zone steps formed on a plane surface; and
a second optical surface opposite to the first optical surface, the second optical surface comprising a concave refractive surface;

wherein the diffractive structure has such a spherical aberration property that a spherical aberration of an emergent light flux is changed in an under-corrected direction or an over-corrected direction when a wavelength of an incident light flux is shifted to a longer wavelength side, and wherein the diffractive structure is formed so as to satisfy the following relation:

$0.2 \leq |(P_{hf}/P_{hm}) - 2| \leq 6.0$;

wherein $P_{hf}$ is a first interval in a direction perpendicular to an optical axis of the diffractive structure between adjacent steps of the ring-shaped zones of the diffractive structure at a diameter hf, which is a half of a maximum effective diameter hm, and $P_{hm}$ is a second interval in the direction perpendicular to the optical axis of the diffractive structure between adjacent steps of the ring-shaped zones of the diffractive structure at the maximum effective diameter hm.

9. An aberration compensating optical element comprising:

a single plastic lens, comprising a first optical surface comprising a diffractive structure comprising a plurality of ring-shaped zone steps;

wherein the single lens satisfies the following relations:

$P_{T1} < P_{T0} < P_{T2}$ $P_R < 0$ $0 < \Delta P_{AC}/\Delta T_{AC} < 1 \times 10^{-4}$;

wherein $P_{T0}$ is a paraxial power (mm$^{-1}$) of the single lens at a predetermined temperature $T_0$; $P_{T1}$ is a paraxial power (mm$^{-1}$) of the single lens at a temperature $T_1$, which is lower than the predetermined temperature $T_0$; $P_{T2}$ is a paraxial power (mm$^{-1}$) of the single lens at a temperature $T_2$, which is higher than the predetermined temperature $T_0$; $P_R$ is a refractive power (mm$^{-1}$) of the single lens as a refractive lens; and $\Delta P_{AC}$ is an amount of a change in a paraxial power (mm$^{-1}$) of the single lens, which is caused by the temperature change $\Delta T_{AC}$ (° C.) of the single lens.

10. An aberration compensating optical element comprising:

a single plastic lens, comprising a first optical surface comprising a diffractive structure comprising a plurality of ring-shaped zone steps;

wherein the single lens satisfies the following relations:

$P_{T1} < P_{T0} < P_{T2}$ $P_R < 0$;

wherein $P_{T0}$ is a paraxial power (mm$^{-1}$) of the single lens at a predetermined temperature $T_0$; $P_{T1}$ is a paraxial power (mm$^{-1}$) of the single lens at a temperature $T_1$, which is lower than the predetermined temperature $T_0$; $P_{T2}$ is a paraxial power (mm$^{-1}$) of the single lens at a temperature $T_2$, which is higher than the predetermined temperature $T_0$; and $P_R$ is a refractive power (mm$^{-1}$) of the single lens as a refractive lens, and wherein a paraxial power $P_{\lambda 0}$ (mm$^{-1}$) of the single lens is substantially zero at the wavelength $\lambda_0$ of a light flux, which passes through the single lens.

11. An aberration compensating optical element comprising:
- a single plastic lens, comprising a first optical surface comprising a diffractive structure comprising a plurality of ring-shaped zone steps;
- wherein the single lens satisfies the following relations:

$$P_{T1} < P_{T0} < P_{T2}$$

$$P_R < 0;$$

wherein $P_{T0}$ is a paraxial power (mm$^{-1}$) of the single lens at a predetermined temperature $T_0$; $P_{T1}$ is a paraxial power (mm$^{-1}$) of the single lens at a temperature $T_1$, which is lower than the predetermined temperature $T_0$; $P_{T2}$ is a paraxial power (mm$^{-1}$) of the single lens at a temperature $T_2$, which is higher than the predetermined temperature $T_0$; and $P_R$ is a refractive power (mm$^{-1}$) of the single lens as a refractive lens, and wherein at least one ring-shaped zone step having a step distance $\Delta$ (mm) in a direction of an optical axis between adjacent steps of the plurality of ring-shaped zone steps is formed within an effective diameter so that m, defined by the following equations, becomes an integer except 0 and ±1:

$$m = INT(Y),$$

$$Y = \Delta \times (n-1)/(\lambda_0 \times 10^{-3}),$$

wherein INT(Y) is an integer obtained by rounding Y; $\lambda_0$ is the wavelength (nm) of a light flux, which passes through the single lens; and n is a refractive index of the single lens at the wave length $\lambda_0$ (nm).

12. An aberration compensating optical element comprising:
- a single plastic lens, comprising a first optical surface comprising a diffractive structure comprising a plurality of ring-shaped zone steps;
- wherein the single lens satisfies the following relations:

$$P_{T1} < P_{T0} < P_{T2}$$

$$P_R < 0;$$

wherein $P_{T0}$ is a paraxial power (mm$^{-1}$) of the single lens at a predetermined temperature $T_0$; $P_{T1}$ is a paraxial power (mm$^{-1}$) of the single lens at a temperature $T_1$, which is lower than the predetermined temperature $T_0$; $P_{T2}$ is a paraxial power (mm$^{-1}$) of the single lens at a temperature $T_2$, which is higher than the predetermined temperature $T_0$; and $P_R$ is a refractive power (mm$^{-1}$) of the single lens as a refractive lens, and wherein the diffractive structure has such a spherical aberration property that a spherical aberration of an emergent light flux is changed in an under-corrected direction or an over-corrected direction when a wavelength of an incident light flux is shifted to a longer wavelength side, and wherein the diffractive structure is formed so as to satisfy the following relation:

$$0.2 \leq |(P_{hf}/P_{hm}) - 2| \leq 6.0;$$

wherein $P_{hf}$ is a first interval in a direction perpendicular to an optical axis of the diffractive structure between adjacent steps of the ring-shaped zones of the diffractive structure at a diameter hf, which is a half of a maximum effective diameter hm, and $P_{hm}$ is a second interval in the direction perpendicular to the optical axis of the diffractive structure between adjacent steps of the ring-shaped zones of the diffractive structure at the maximum effective diameter hm.

\* \* \* \* \*